(12) United States Patent
Kim et al.

(10) Patent No.: US 11,277,037 B2
(45) Date of Patent: Mar. 15, 2022

(54) METHOD FOR WIRELESS CHARGING AND ELECTRONIC DEVICE THEREOF

(71) Applicant: Samsung Electronics Co., Ltd., Suwon-si (KR)

(72) Inventors: Soo-Hyung Kim, Hwaseong-si (KR); Hun-Cheol Oh, Seoul (KR); Ji-Hyun Park, Seongnam-si (KR); Soon-Hyun Cha, Anyang-si (KR); Young-Joon Kim, Hwaseong-si (KR); Hyun-Soo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/998,976

(22) Filed: Aug. 20, 2020

(65) Prior Publication Data

US 2020/0381957 A1 Dec. 3, 2020

Related U.S. Application Data

(63) Continuation of application No. 14/460,301, filed on Aug. 14, 2014, now abandoned.

(30) Foreign Application Priority Data

Aug. 14, 2013 (KR) ........................ 10-2013-0096486

(51) Int. Cl.
*H02J 7/00* (2006.01)
*H02J 50/40* (2016.01)
(Continued)

(52) U.S. Cl.
CPC ............ *H02J 50/40* (2016.02); *H02J 7/0077* (2013.01); *H02J 50/12* (2016.02); *H02J 50/80* (2016.02); *H02J 7/00* (2013.01); *H02J 7/00034* (2020.01)

(58) Field of Classification Search
USPC .................................... 320/106–115
See application file for complete search history.

(56) References Cited

U.S. PATENT DOCUMENTS 7,715,884 B2 * 5/2010 Book .................. H02J 7/0003
455/572
8,373,386 B2 2/2013 Baarman et al.
(Continued)

FOREIGN PATENT DOCUMENTS

JP     2011-155755 A      8/2011
KR     10-2011-0103455 A      9/2011
(Continued)

OTHER PUBLICATIONS

Notice of Preliminary Rejection dated Sep. 17, 2019 in connection with Korean Patent Application No. 10-2013-0096486, 17 pages.
(Continued)

*Primary Examiner* — Binh C Tat

(57) ABSTRACT

A wireless power transmitter performs a method for supplying power for wireless charging from the wireless power transmitter to a plurality of wireless power receivers. The wireless charging method includes allocating priorities to one or more electronic devices that connect for wireless charging, and supplying wireless power to the one or more electronic devices based on the priorities. Other embodiments may be implemented.

19 Claims, 16 Drawing Sheets

(51) Int. Cl.
  *H02J 50/80* (2016.01)
  *H02J 50/12* (2016.01)

(56) References Cited

U.S. PATENT DOCUMENTS

| | | |
|---|---|---|
| 8,970,180 B2 | 3/2015 | Li |
| 10,312,696 B2 | 6/2019 | Lee et al. |
| 2011/0127951 A1 | 6/2011 | Walley et al. |
| 2012/0112692 A1 | 5/2012 | Arai |
| 2012/0153894 A1 | 6/2012 | Widmer |
| 2012/0161696 A1 | 6/2012 | Cook et al. |
| 2012/0200158 A1 | 8/2012 | Takei |
| 2013/0154558 A1 | 6/2013 | Lee et al. |
| 2013/0181665 A1 | 7/2013 | Lee et al. |
| 2013/0307468 A1* | 11/2013 | Lee ............ H02J 50/90 320/108 |
| 2014/0015335 A1* | 1/2014 | Lee ............ H02J 7/025 307/104 |
| 2014/0035380 A1 | 2/2014 | Stevens et al. |
| 2014/0375262 A1 | 12/2014 | Yamaguchi et al. |

FOREIGN PATENT DOCUMENTS

| | | |
|---|---|---|
| KR | 10-2012-0005484 A | 1/2012 |
| KR | 10-2012-0077444 A | 7/2012 |
| KR | 10-2012-0103637 A | 9/2012 |
| KR | 10-2012-0134999 A | 12/2012 |
| KR | 10-2013-0012852 A | 2/2013 |
| KR | 10-2013-0069346 A | 6/2013 |

OTHER PUBLICATIONS

Notice of Patent Grant dated Mar. 10, 2020 in connection with Korean Patent Application No. 10-2013-0096486, 4 pages.

* cited by examiner

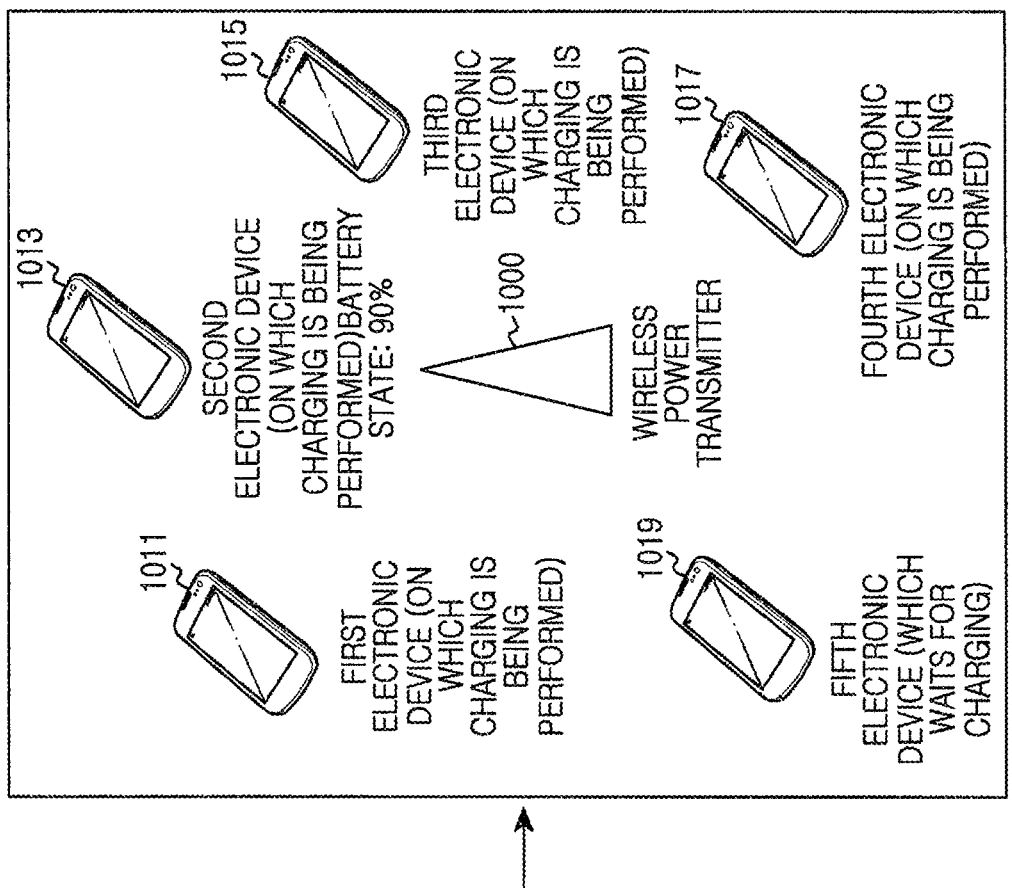
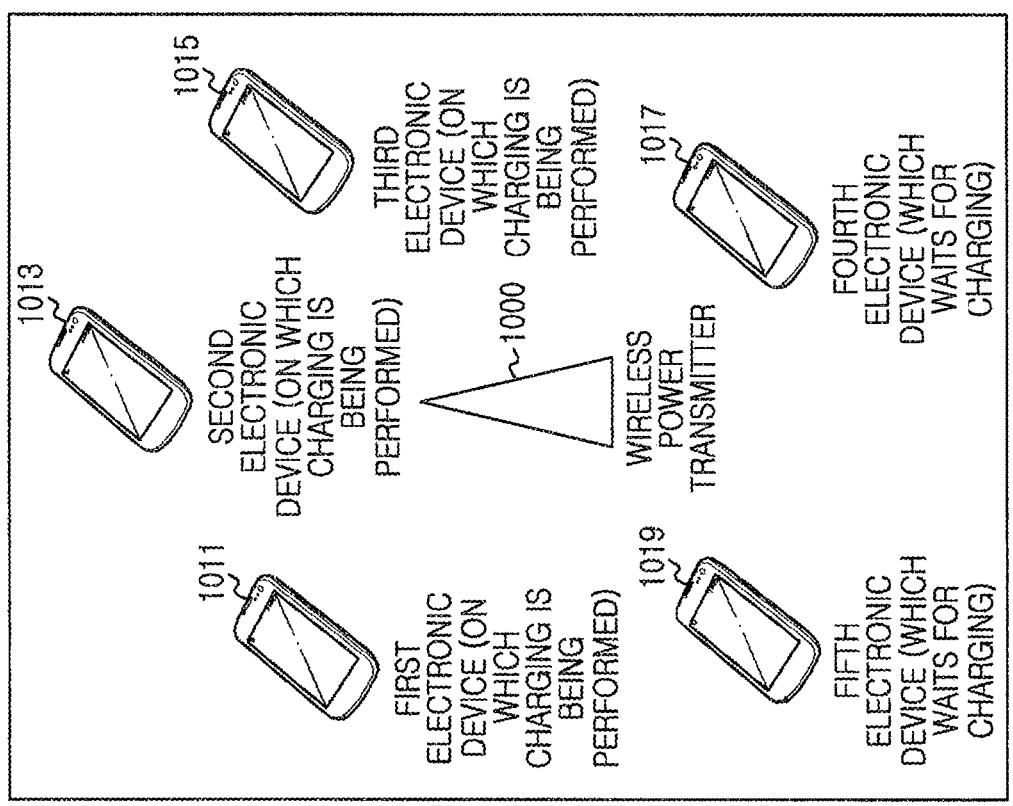

METHOD FOR WIRELESS CHARGING AND ELECTRONIC DEVICE THEREOF

CROSS-REFERENCE TO RELATED APPLICATION

The present application is a continuation of U.S. patent application Ser. No. 14/460,301 filed on Aug. 14, 2014, which is based on and claims priority under 35 U.S.C. § 119 to Korean Patent Application No. 10-2013-0096486 filed on Aug. 14, 2013 in the Korean Intellectual Property Office, the disclosures of which are herein incorporated by reference in their entirety.

BACKGROUND

1. Field

Various embodiments of the present disclosure relate generally to a method for the wireless charging of an electronic device.

2. Description of Related Art

With the development of information communication and semiconductor technologies, various electronic devices have developed into multimedia devices that provide various multimedia services. For example, portable electronic devices may provide various multimedia services such as broadcasting services, wireless internet services, camera services and music play services.

Since the portable electronic devices include batteries for portability, the periodic charging of the batteries is needed. In general, batteries are charged by using cables. However, with the recent development of a wireless power transmission (WPT) technology, wireless charging devices that may perform wireless charging have been commercialized and distributed.

SUMMARY

Wireless charging technologies may be classified into electromagnetic induction techniques and electromagnetic resonance techniques.

The electromagnetic induction technique may transmit and receive power when an electronic device is very close to an electrode. It is possible to perform wireless charging when a transmission device (generally, referred to as a "wireless charging pad") transmitting power is in contact with a reception device (e.g., an electronic device) receiving power.

In the case of the electromagnetic resonance technique, since a wireless power transmission device transmitting power may supply power to an electronic device that is at a certain distance, it is possible to perform wireless charging even if the wireless power transmission device is not in touch with the electronic device. For example, when using the electromagnetic resonance technique, one wireless power transmission device may supply power to a plurality of electronic devices for wireless charging.

There is a need for a solution to efficiently supply power for wireless charging to a plurality of electronic devices.

To address the above-discussed deficiencies, it is a primary object to provide an apparatus and method for setting a wireless charging priority among electronic devices connected for wireless charging by a wireless power transmitter.

An embodiment of the present disclosure may provide an apparatus and method for setting a wireless charging priority among electronic devices connected for wireless charging, when exceeding power capacity that the wireless power transmitter may charge.

An embodiment of the present disclosure may provide an apparatus and method for setting a wireless charging priority among electronic devices based on a connection time for wireless charging, when exceeding power capacity that the wireless power transmitter may charge.

An embodiment of the present disclosure may provide an apparatus and method for setting a wireless charging priority among electronic devices based on the battery states of the electronic devices connected for wireless charging, when exceeding power capacity that the wireless power transmitter may charge.

An embodiment of the present disclosure may provide an apparatus and method for controlling the wireless charging priorities of electronic devices based on the charging states of the electronic devices connected for wireless charging by a wireless power transmitter.

An embodiment of the present disclosure may provide an apparatus and method for controlling the wireless charging priorities of electronic devices based on the battery states of the electronic devices connected for wireless charging by a wireless power transmitter.

According to an aspect of the present disclosure, a wireless charging method includes allocating priorities to one or more electronic devices that connect for wireless charging, and supplying wireless power to the one or more electronic devices based on the priorities.

According to another aspect of the present disclosure, a wireless power transmitter includes a power transmission unit configured to supply wireless power to one or more electronic devices, a priority allocation module configured to allocate priorities to the one or more electronic devices that connect for wireless charging, and a control module configured to supply wireless power to the one or more electronic devices through the power transmission unit based on the priorities.

According to another aspect of the present disclosure, an electronic device includes a battery configured to supply power to the electronic device, a power reception unit configured to receive wireless power from a wireless power transmitter, and a control module configured to be switched to a charging standby mode or a charging mode based on allocated priorities exceeding a rated power capacity of the wireless power transmitter.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A and 10B show a configuration for changing a wireless charging priority based on the battery state of a wireless power receiver according to an embodiment of the present disclosure;

DETAILED DESCRIPTION

Figure 1:
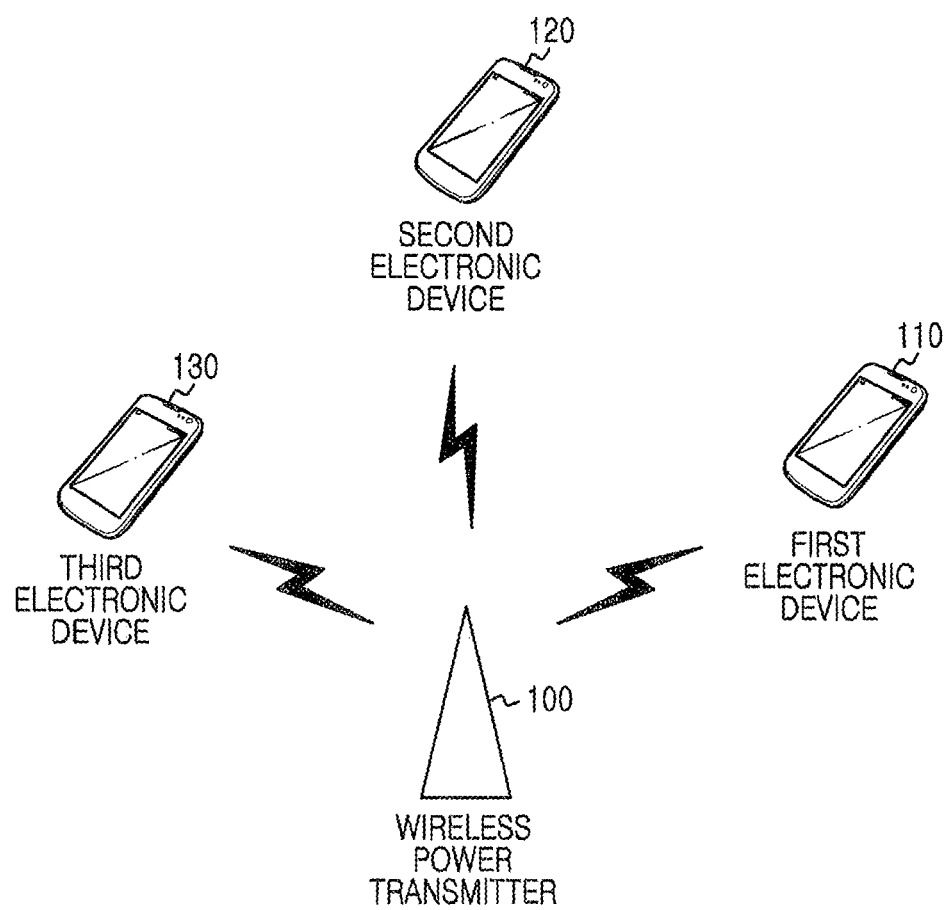
FIG. 1 is a schematic diagram of a wireless charging system according to an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure will be described herein below with reference to the accompanying drawings. Although specific embodiments of the present disclosure are illustrated in the drawings and relevant detailed descriptions are provided, various changes can be made to the exemplary embodiments and various exemplary embodiments may be provided. Accordingly, the various exemplary embodiments of the present disclosure are not limited to the specific embodiments and should be construed as including all changes and/or equivalents or substitutes included in the ideas and technological scopes of the exemplary embodiments of the present disclosure. In the explanation of the drawings, similar reference numerals are used for similar elements.

The term "include" or "may include" used in the exemplary embodiments of the present disclosure indicates the presence of disclosed corresponding functions, operations, elements, etc., and does not limit additional one or more functions, operations, elements, etc. In addition, it should be understood that the term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

The term "or" or "at least one of A or/and B" used in the various exemplary embodiments of the present disclosure includes any and all combinations of the associated listed items. For example, the term "A or B" or "at least one of A or/and B" may include A, B, or all of A and B.

Although the terms such as "first" and "second" used in the various exemplary embodiments of the present disclosure may modify various elements of the various exemplary embodiments, these terms do not limit the corresponding elements. For example, these terms do not limit an order and/or importance of the corresponding elements. These terms may be used for the purpose of distinguishing one element from another element. For example, a first user device and a second user device all indicate user devices or may indicate different user devices. For example, a first element may be named as a second element without departing from the right scope of the various exemplary embodiments of the present disclosure, and similarly, a second element may be named as a first element.

It will be understood that when an element is "connected" or "coupled" to another element, the element may be directly connected or coupled to the other element, and there may be another new element between the element and the another element. To the contrary, it will be understood that when an element is "directly connected" or "directly coupled" to another element, there is no other element between the element and the another element.

The terms used in the various exemplary embodiments of the present disclosure are for the purpose of describing particular exemplary embodiments only and are not intended to be limiting. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to various embodiments of the present disclosure may be a device which is equipped with a wireless charging function. For example, the electronic device may include at least one of a smartphone, a tablet PC, a mobile phone, a video phone, an electronic book reader, a desktop PC, a laptop PC, a net book computer, a personal digital assistant (PDA), a portable multimedia player (PMP), an MP3 player, a mobile medical machine, a camera, and a wearable device (for example, a head-mounted-device (HMD) such as electronic glasses, electronic clothing, an electronic bracelet, an electronic necklace, an electronic accessory, an electronic tattoo, or a smart watch).

According to an embodiment, the electronic device may be a smart home appliance which is equipped with a wireless charging function. For example, the smart home appliance may include at least one of a television, a digital versatile disk (DVD) player, a stereo, a refrigerator, an air conditioner, a cleaner, an oven, a microwave oven, a washing machine, an air cleaner, a set-top box, a TV box (for example, SAMSUNG HOMESYNC, APPLE TV, or GOOGLE TV), a game console, an electronic dictionary, an electronic key, a camcorder, and an electronic album.

According to an embodiment, the electronic device may include at least one of various medical machines (for example, magnetic resonance angiography (MRA), magnetic resonance imaging (MM), computerized tomography (CT), a tomograph, an ultrasound machine, etc.), a navigation device, a global positioning system (GPS) receiver, an event data recorder (EDR), a flight data recorder (FDR), an automotive infotainment device, an electronic equipment for ship (for example, a navigation equipment for ship, a gyro compass, etc.), an airline electronic device, a security device, a head unit for a car, an industrial or home service robot, an automated teller machine (ATM) of a financial institution, and a point-of-sales (POS) of a store, which are equipped with a wireless charging function.

According to an embodiment, the electronic device may include at least one of a part of furniture or a building or structure equipped with a wireless charging function, an electronic board, an electronic signature input device, a projector, and various measurement devices (for example, water, power, gas, radio waves, etc.). The electronic device according to various embodiments of the present disclosure may be one or a combination of one or more of the above-mentioned devices. In addition, the electronic device according to various embodiments of the present disclosure may be a flexible device. In addition, it is obvious to an ordinary skilled person in the related art that the electronic device according to various embodiments of the present disclosure is not limited to the above-mentioned devices.

Embodiments of the present disclosure describe a technology for supplying power for wireless charging to a plurality of wireless power receivers by a wireless power transmitter.

It may be assumed that in the embodiments of the present disclosure, the wireless power transmitter uses a wireless charging technique that may supply power to at least one wireless power receiver present at a certain distance, such as an electromagnetic resonance technique using resonance or an electric wave technique that converts and transmits electrical energy into a micro wave.

FIG. 1 is a schematic diagram of a wireless charging system according to an embodiment of the present disclosure.

Referring to FIG. 1, the wireless charging system may include a wireless power transmitter 100, and at least one electronic device 110 to 130.

When the plurality of electronic devices 110 to 130 is connected to the wireless power transmitter 100, the wireless power transmitter 100 may transmit wireless power to the electronic devices 110 to 130. For example, the wireless power transmitter 100 may transmit wireless power to at least one authenticated electronic device 110, 120 or 130 among the electronic devices 110 to 130 in a service area. In this case, the wireless power transmitter 100 may also transmit or receive at least one control signal for wireless charging to or from the electronic devices 110 to 130.

The electronic devices 110 to 130 may receive wireless power from the wireless power transmitter 100 and charge batteries therein. In this case, the electronic devices 110 to 130 may transmit signals requesting wireless power transmission, control information on wireless power reception, or control information on an electronic device such as state information.

Figure 2:
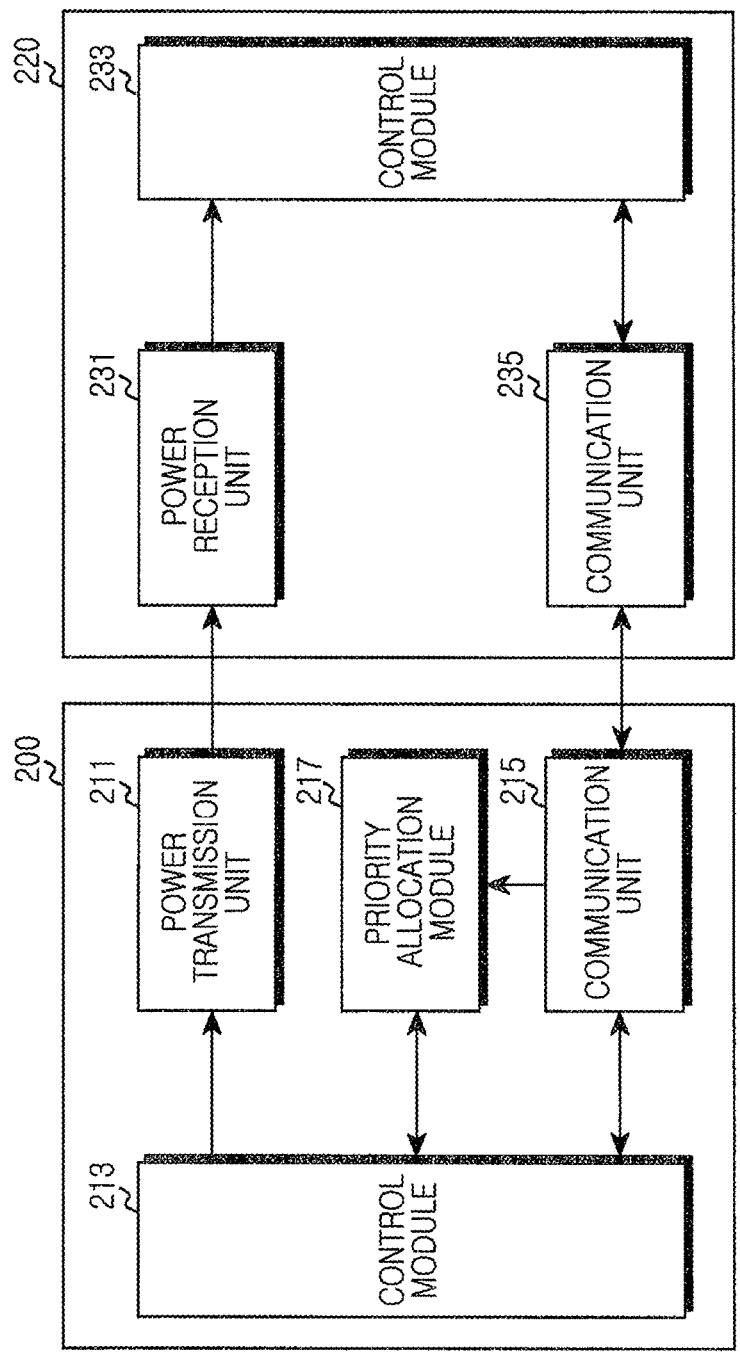
FIG. 2 shows block diagrams of a wireless charging transmitter and a wireless power receiver according to an embodiment of the present disclosure.

FIG. 2 shows block diagrams of a wireless charging transmitter and a wireless power receiver according to an embodiment of the present disclosure.

Referring to FIG. 2, the wireless power system may include a wireless power transmitter 200 and at least one wireless power receiver 220.

The wireless power transmitter 200 may include a power transmission unit 211, a control module 213, a communication unit 215, and a priority allocation module 217.

Figure 3:
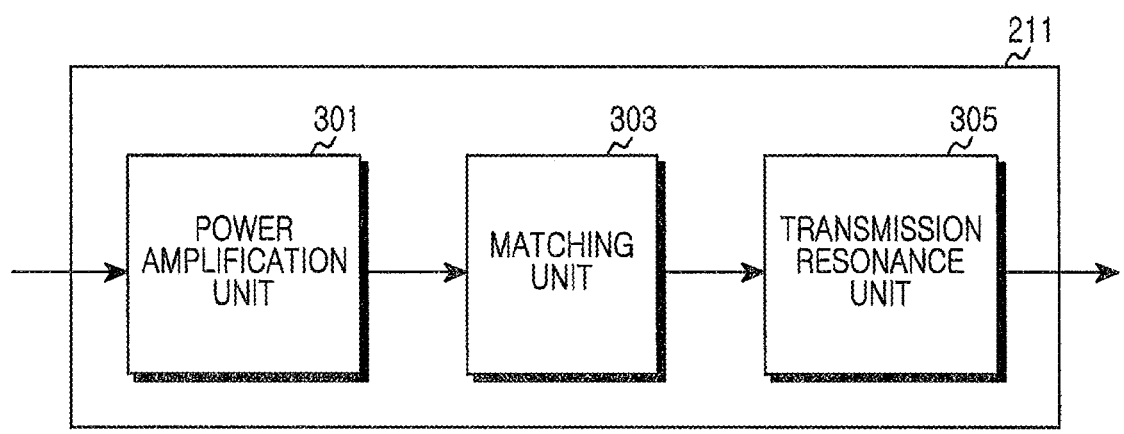
FIG. 3 is a detailed block diagram of a power transmission unit according to an embodiment of the present disclosure.

The power transmission unit 211 may wirelessly transmit power determined by the control module 213 to at least one wireless power receiver 220. For example, the power transmission unit 211 may use the power of the power transmission unit 211 to wirelessly transmit power determined by the control module 213 to at least one wireless power receiver 220. For another example, the power transmission unit 211 may be implemented as a power reception interface and use external power to wirelessly transmit power determined by the control module 213 to at least one wireless power receiver 220. In this case, the power transmission unit 211 may supply alternating current (AC) power. If the wireless power transmitter 200 uses the electromagnetic resonance type wireless charging technique, the power transmission unit 211 may be configured as shown in FIG. 3.

The control module 213 may be configured to control the overall operations of the wireless power transmitter 200. The control module 213 may determine electrical energy to be transmitted to a service area through the power transmission unit 211 based on power that the wireless power receiver 220 needs. For example, the control module 213 may determine electrical energy to be transmitted to a service area through the power transmission unit 211 based on the wireless charging impedance of at least one wireless power receiver 220 that is in a service area and performs wireless charging. In this case, the control module 213 may determine electrical energy to be transmitted to a service area through the power transmission unit 211 based on the wireless charging impedance of at least one wireless power receiver 220 that is in a service area and performs wireless charging.

The priority allocation module 217 may be configured to allocate the wireless allocation priorities of a plurality of wireless power receivers when wireless power is transmitted to the plurality of wireless power receivers by the control module 213.

For example, the priority allocation module 217 may set wireless charging priorities according to the connection order of the wireless power receivers to the wireless power transmitter 200. For example, the priority allocation module 217 may set wireless charging priorities according to the connection order of at least one wireless power receiver connecting through the communication unit 215 from when the rated power of the wireless power transmitter 200 is exceeded. In this example, when the rated power of the wireless power transmitter 200 is exceeded may include when the supply of wireless power is limited to a wireless power receiver that newly connects according to the power capacity of the wireless power transmitter 200. In this case, the wireless power transmitter 200 may check power capacity used for supplying wireless power based on the number of wireless power receivers on which wireless charging is being performed, or power capacity needed by wireless power receivers on which wireless charging is being performed.

For another example, the priority allocation module 217 may set wireless charging priorities according to the battery states of the wireless power receivers connected to the wireless power transmitter 200. For example, the priority allocation module 217 may set wireless charging priorities based on the battery state of at least one wireless power receiver connecting through the communication unit 215 from when the rated power of the wireless power transmitter 200 is exceeded.

For still another example, the priority allocation module 217 may also set wireless charging priorities based on the wireless charging impedance of the wireless power receivers connected to the wireless power transmitter 200.

The control module 213 may be configured to transmit or receive a charging mode switch request signal to at least one wireless power receiver 220 on which wireless charging is being performed, through the communication unit 215 when the priority allocation module 217 sets wireless charging priorities.

The control module 213 may be configured to select a wireless power receiver according to wireless charging priorities when the priority allocation module 200 sets wireless charging priorities and the power capacity of the wireless power transmitter 200 has a margin.

For example, when there is a wireless power receiver that disconnects from the wireless power transmitter 200, the control module 213 may recognize that the power capacity of the wireless power transmitter 200 has a margin.

For another example, the control module 213 may also switch the mode of a wireless power receiver having a battery state equal to or higher than a reference value to a charging standby mode so that the power capacity of the wireless power transmitter 200 has a margin.

For still another example, the control module 213 may also switch a wireless power receiver of which the charging operation is switched to a constant voltage (CV) mode, to a charging standby mode so that the power capacity of the wireless power transmitter 200 has a margin.

The communication unit 215 may connect communication between at least one wireless power receiver 220 and the wireless power transmitter 200.

For example, the communication unit 215 may transmit state information on the wireless power transmitter 200 and a charging control signal to at least one wireless power receiver 220 according to the control of the control module 213. In this example, the state information may include one or more of the communication protocol type of the wireless power transmitter 200 and a network identifier, and the charging control signal may include a control signal for one or more of a charging instruction and a charging mode switch request.

For another example, the communication unit 215 may receive power information on the wireless power receiver 220. In this example, the power information may include one or more of the capacity, battery state, number of charging times, used amount, battery capacity, and battery percentage of the wireless power receiver 220.

For still another example, the communication unit 215 may transmit the wireless charging priorities of wireless power receivers to corresponding wireless power receivers 220 according to the control of the control module 213 or the priority allocation module 217.

The communication unit 215 may support short-range communication protocols (e.g., WiFi, BT and near field communication (NFC)) or network communication (e.g., internet, a LAN, a WAN, Zigbee, electric communication network, a cellular network, a satellite network, or POTS).

In the embodiment described above, the wireless power transmitter 200 may include the priority allocation module 217 that allocates a wireless charging priority, and the control module 213 that allows wireless power to be supplied according to the wireless charging priority. For example, the control module 213 and the priority allocation module 217 of the wireless power transmitter 200 may allow one or more programs stored in a memory to be executed to allocate a wireless charging priority and may allow wireless power to be supplied to the wireless power receiver 220 according to the wireless charging priority.

In another example, the wireless power transmitter 200 may allow one module to allocate the wireless charging priority and supply wireless power according to the wireless charging priority. For example, the control module 213 of the wireless power transmitter 200 may allow one or more programs stored in a memory to be executed to allocate the wireless charging priority and may allow wireless power to be supplied according to the wireless charging priority.

The wireless power receiver 220 may include a power reception unit 231, a control module 233, and a communication unit 235.

Figure 4:
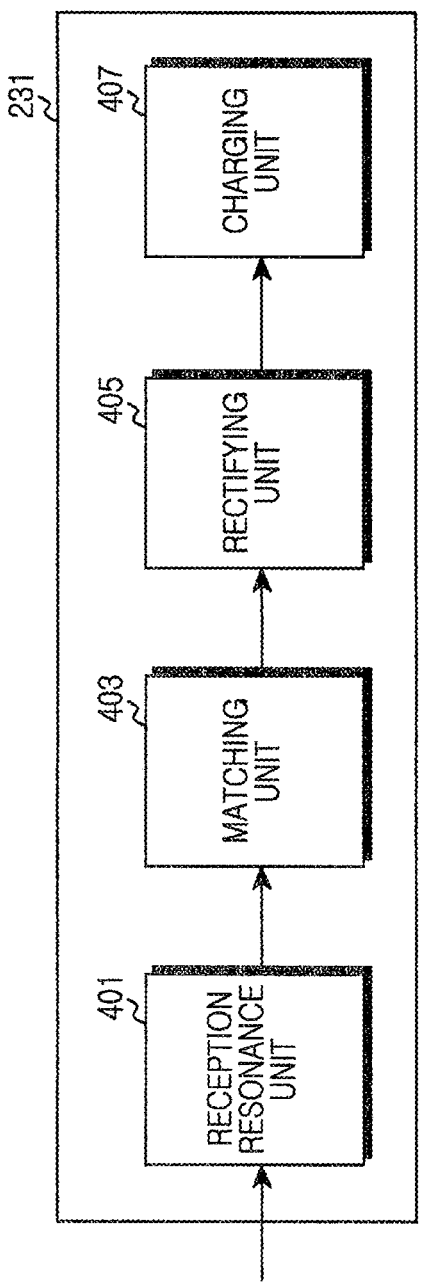
FIG. 4 is a detailed block diagram of a power reception unit according to an embodiment of the present disclosure.

The power reception unit 231 may convert wireless power received from the wireless power transmitter 200 into a direct current (DC) power signal and supply power for the charging of a battery (not shown). If the wireless power receiver 220 uses the electromagnetic resonance type wireless charging technique, the power reception unit 231 may be configured as shown in FIG. 4 below.

The control module 233 may be configured to control the overall operations of the wireless power receiver 220.

The control module 233 may be configured to generate a control signal for receiving wireless power, transmit the control signal to the wireless power transmitter 200 through the communication unit 235, and control wireless charging according to the control signal provided from the wireless power transmitter 200 through the communication unit 235.

For example, the control module 233 may allow a connection to the wireless power transmitter 200 to be ended when the battery is completely charged. In this case, the control module 233 may also allow information representing that the battery is completely charged, to be transmitted to the wireless power transmitter 200 through the communication unit 235.

For another example, when a charging mode switch request signal is received from the wireless power transmitter 200 through the communication unit 235 and a battery state is equal to or higher than a reference value, the control module 233 may allow the mode of the receiver to be switched to a charging standby mode or a connection to the wireless power transmitter 200 to be ended.

For another example, when a charging mode switch request signal is received from the wireless power transmitter 200 through the communication unit 235 and a charging operation is switched to a constant voltage mode, the control module 233 may allow the mode of the receiver to be switched to a charging standby mode or may allow a connection to the wireless power transmitter 200 to be ended.

For still another example, when priority allocation information is received from the wireless power transmitter 200 through the communication unit 235, the control module 233 may allow the receiver to operate in a charging standby mode. For still another example, when a charging instruction signal is received from the wireless power transmitter 200 through the communication unit 235, the control module 233 may allow the receiver to perform wireless charging. For still another example, when information representing that the power capacity of the wireless power transmitter 200 has a margin is received through the communication unit 235 while the receiver operates in a charging standby mode, the control module 233 may allow the receiver to perform wireless charging based on wireless charging priorities. For example, the control module 233 may allow wireless charging to be performed according to the information representing that the power capacity of the wireless power transmitter 200 has a margin, when its wireless charging priority is highest.

The communication unit 235 may connect communication between the wireless power transmitter 200 and the wireless power receiver 220.

For example, the communication unit 235 may transmit power information on the wireless power receiver 220 to the wireless power transmitter 200 according to the control of the control module 233. In this example, the power information may include one or more of the capacity, battery state, charging number, usage, battery capacity and battery percentage of the wireless power receiver 220.

For another example, the communication unit 235 may transmit, to the control module 213, state information on the wireless power transmitter 200 and a charging control signal received from the wireless power transmitter 200. In this example, the state information may include one or more of the communication protocol type of the wireless power transmitter 200 and a network identifier, and the charging control signal may include a control signal for one or more of a charging instruction and a charging mode change. In this case, the communication unit 235 may support a short-range communication protocol or network communication.

In the embodiment described above, the control module 233 of the wireless power receiver 220 may allow wireless charging to be performed according to the control signal provided from the wireless power transmitter 200. In this case, the control module 233 of the wireless power receiver 220 may allow one or more programs stored in a memory to be executed to perform wireless charging according to the control signal provided from the wireless power transmitter 200.

FIG. 3 is a detailed block diagram of a power transmission unit according to an embodiment of the present disclosure.

Referring to FIG. 3, the power transmission unit 211 may include a power amplification unit 301, a matching unit 303, and a transmission resonance unit 305.

The power amplification unit 301 may convert a certain level of a DC voltage to an AC voltage to generate power. For example, the power amplification unit 301 may use a reference resonance frequency to convert the DC voltage supplied to the power amplification unit 301 into the AC voltage to generate power.

The matching unit 303 may correct the impedance matching error between the transmission resonance unit 305 and a reception resonance unit 401 of the wireless power receiver 220 according to the control of the control module 213. For example, the matching unit 303 may include a capacitor or an inductor.

The transmission resonance unit 305 may generate electromagnetic energy corresponding to power generated by the power amplification unit 301 and transmit generated energy to the wireless power receiver 220.

FIG. 4 is a detailed block diagram of the power reception unit according to an embodiment of the present disclosure.

Referring to FIG. 4, the power reception unit 231 may include a power resonance unit 401, a matching unit 403, a rectifying unit 405, and a charging unit 407.

The reception resonance unit 401 may receive electromagnetic energy generated by the transmission resonance unit 305 of the wireless power transmitter 200 and generate power.

The matching unit 403 may correct the impedance matching error between the transmission resonance unit 305 of the wireless power transmission unit 200 and the reception resonance unit 401. For example, the matching unit 403 may include a capacitor, an inductor, or a capacitor and an inductor.

The rectifying unit 405 may rectify an AC voltage generated by the reception resonance unit 401 to be a DC voltage.

The charging unit 407 may use the DC voltage provided from the rectifying unit 405 to charge a battery according to the control of the control module 233. In this case, the charging unit 407 may further include a DC-DC converter and thus charge a battery with a rated voltage generated by adjusting the signal level of the DC voltage provided from the rectifying unit 405.

Figure 5:
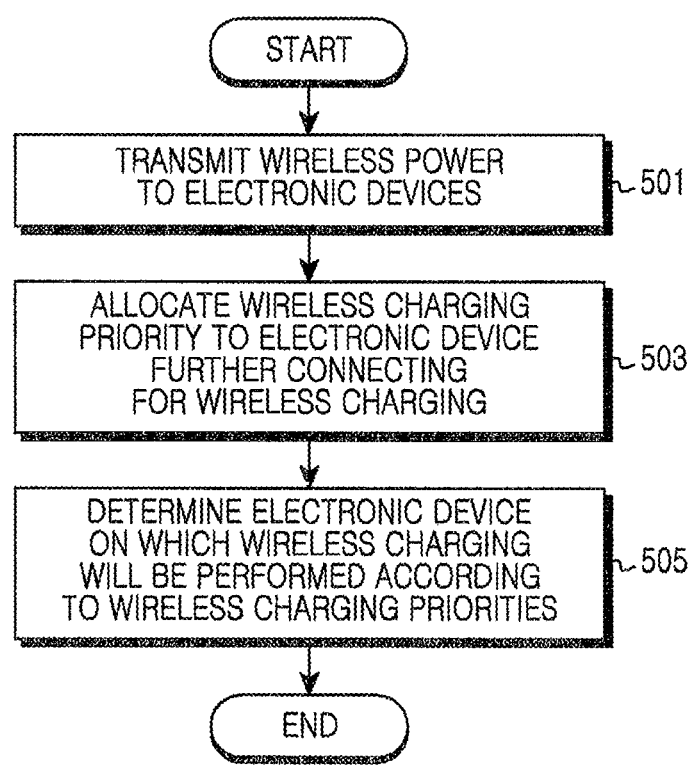
FIG. 5 shows a procedure for allocating a wireless charging priority to a wireless power receiver according to an embodiment of the present disclosure.

FIG. 5 shows a procedure of allocating the wireless charging priority to the wireless power receiver according to an embodiment of the present disclosure.

Referring to FIG. 5, the wireless power transmitter may transmit wireless power to at least one electronic device placed in a service area in operation 501. In this case, the wireless power transmitter may determine electrical energy to be transmitted to the service area based on the wireless charging impedance of at least one electronic device that is in the service area and perform wireless charging.

When an electronic device for wireless charging further connects, the wireless power transmitter may allocate a wireless charging priority to a corresponding electronic device in operation 503. For example, referring to FIG. 6A, when at least one electronic device connects while the wireless power transmitter transmits wireless power corresponding to rated power capacity, the wireless power transmitter may set a wireless charging priority based on when at least one electronic device connects. For another example, referring to FIGS. 8A to 8B, when at least one electronic device connects while the wireless power transmitter transmits wireless power corresponding to rated power capacity, the wireless power transmitter may set a wireless charging priority based on the battery state of at least one electronic device. For still another example, when an electronic device for wireless charging connects, the wireless power transmitter may also set and change wireless charging priorities based on the wireless charging impedance of connected electronic devices.

The wireless power transmitter may determine on which electronic device wireless charging will be performed according to the wireless charging priorities of the electronic devices in operation 505. For example, when the wireless power transmitter has a power capacity margin, the wireless power transmitter may select an electronic device on which wireless charging will be subsequently performed, based on the wireless charging priority of at least one electronic device that waits for charging. The wireless power transmitter may transmit a wireless charging instruction signal to a corresponding electronic device so that the corresponding electronic device may perform wireless charging.

Figure 6B:
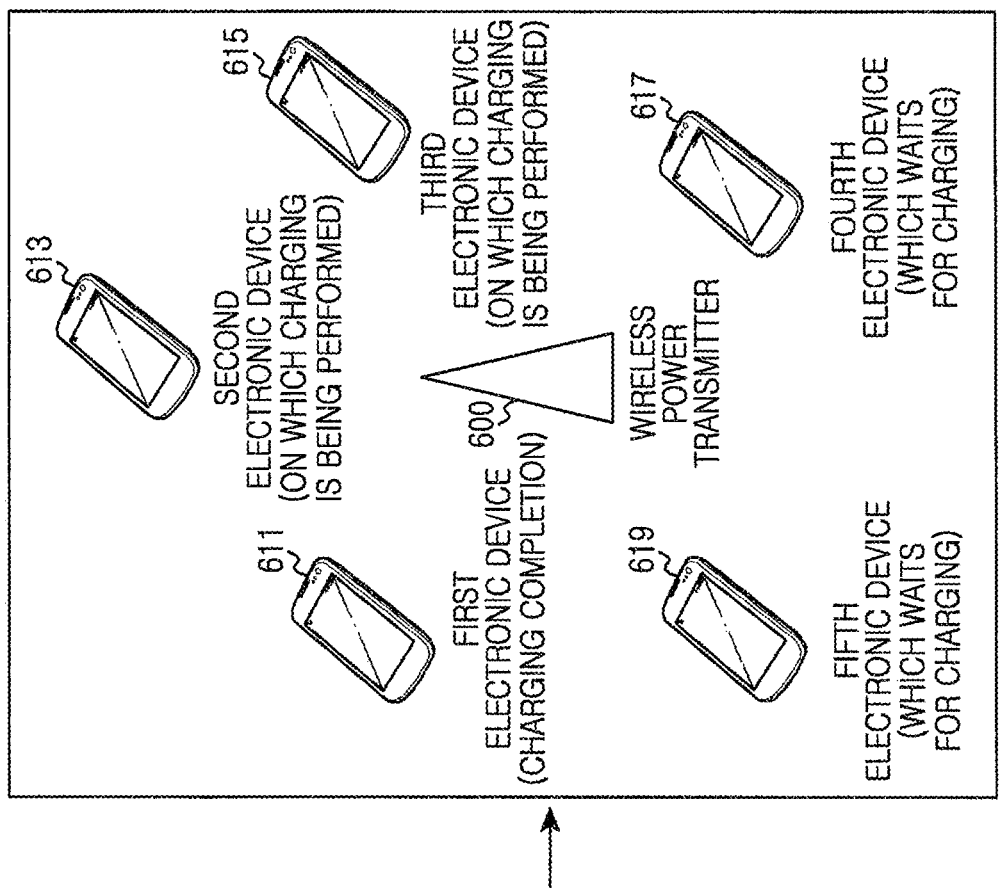
FIGS. 6A and 6B show a configuration for allocating a wireless charging priority based on the connection time of a wireless power receiver according to an embodiment of the present disclosure.
Figure 6A:
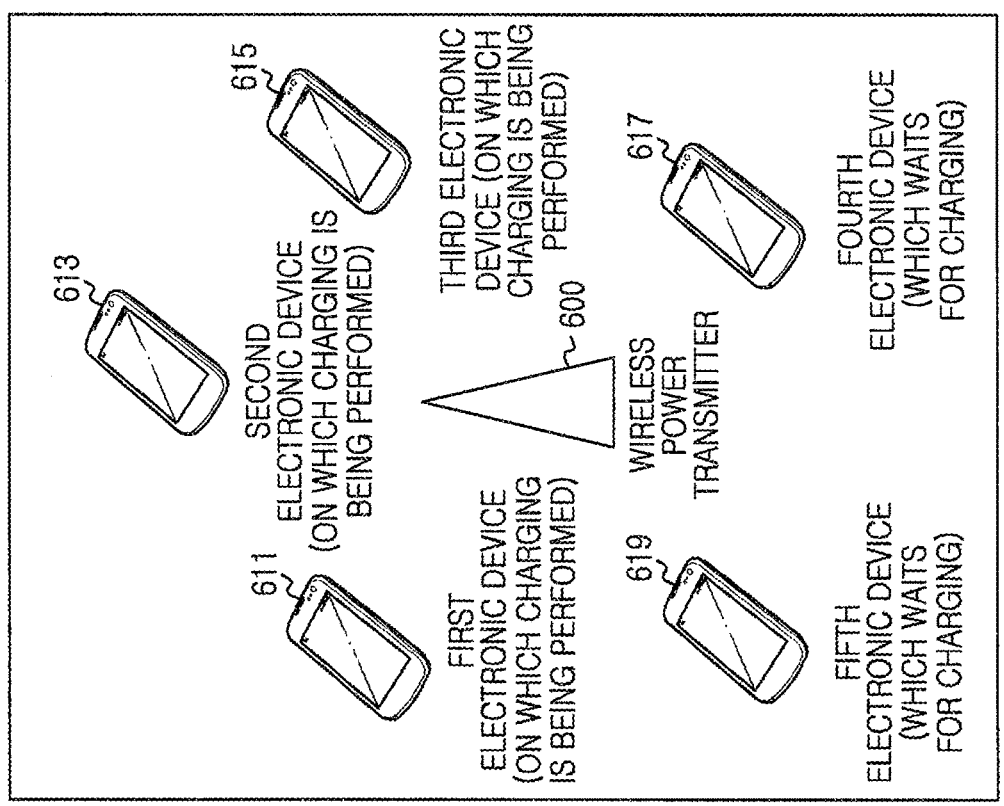

FIGS. 6A and 6B show a configuration for allocating a wireless charging priority based on when the wireless power receiver connects according to an embodiment of the present disclosure.

Referring to FIG. 6A, the wireless power transmitter 600 may transmit wireless power to a plurality of electronic devices 611 to 615.

When electronic devices 617 and 619 further connect to a wireless power transmitter 600 while the wireless power transmitter 600 uses rated power capacity, the wireless power transmitter 600 may control further connected electronic devices 617 and 619 so that they operate in a charging standby mode. The wireless power transmitter 600 may set a wireless charging priority based on when the electronic devices 617 and 619 connect.

As shown in FIG. 6B, when a first electronic device 611 is completely charged, the wireless power transmitter 600 may recognize that there is a power capacity margin. The wireless power transmitter 600 may control a fourth electronic device 617 having a highest priority between the electronic devices 617 and 619 waiting for charging so that the fourth electronic device 617 may perform wireless charging.

Figure 7:
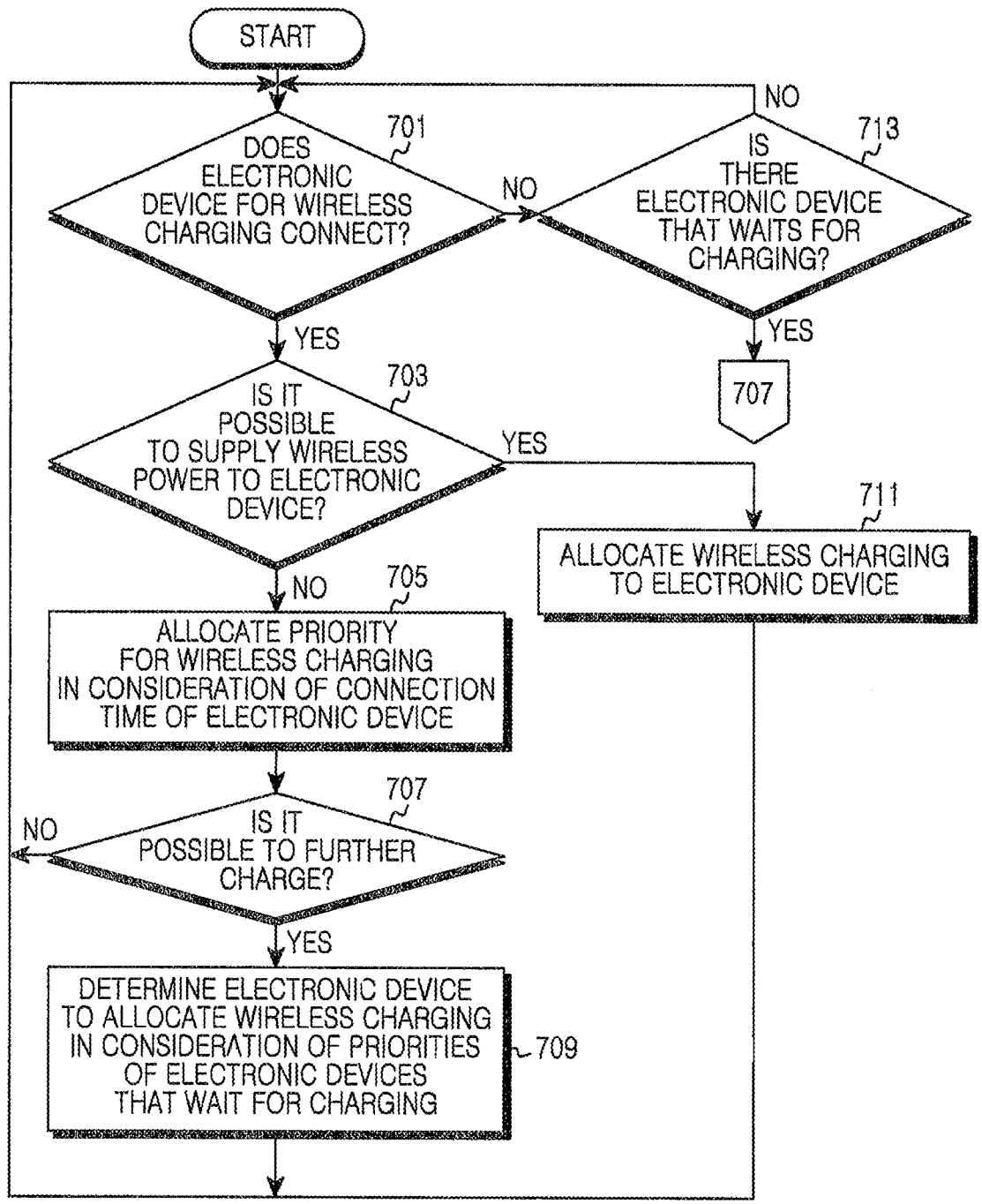
FIG. 7 shows a procedure for allocating a wireless charging priority based on the connection time of a wireless power receiver according to an embodiment of the present disclosure.
Figure 8:
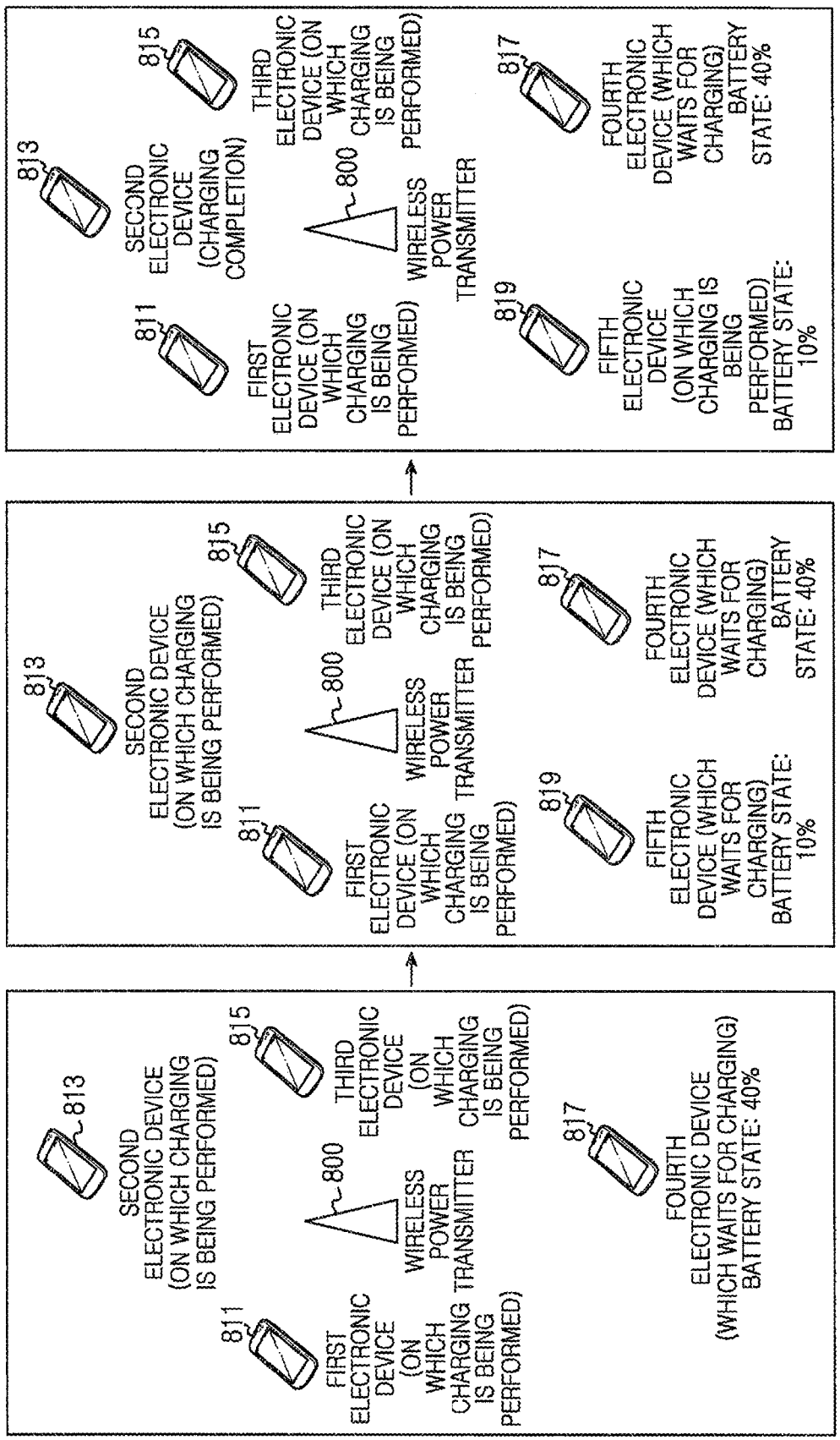
FIGS. 8A to 8C show a configuration for allocating a wireless charging priority based on the battery state of a wireless power receiver according to an embodiment of the present disclosure.

FIG. 7 shows a procedure for allocating a wireless charging priority based on when the wireless power receiver connects according to an embodiment of the present disclosure.

Referring to FIG. 7, the wireless power transmitter may check whether there is an electronic device that connects thereto for wireless charging in operation 701.

When there is no electronic device that connects for wireless charging, the wireless power transmitter may check whether there is an electronic device that waits for charging in operation 713.

When there is no electronic device that waits for charging, the wireless power transmitter may check whether there is an electronic device that connects for wireless charging in operation 701.

When there is an electronic device that waits for charging, the wireless power transmitter may check whether it is possible to perform wireless charging on the electronic device that waits for charging in operation 707.

When there is an electronic device that connects for wireless charging in operation 701, the wireless power transmitter may check whether it is possible to supply wireless power to the electronic device that connects in operation 703. For example, the wireless power transmitter may check whether it is possible to supply wireless power to a newly connected electronic device based on the number of electronic devices on which wireless charging is being performed. For another example, the wireless power transmitter may compare power capacity that may be further supplied from the wireless power transmitter, with wireless charging capacity needed by the newly connected electronic device, and check whether it is possible to supply wireless power to a corresponding electronic device. In this case, the wireless power transmitter may check power capacity that may be further supplied by checking power capacity being used for supplying wireless power based on one or more of the wireless charging capacity, wireless charging impedance, and battery state of at least one electronic device on which wireless charging is being performed.

When it is possible to supply wireless power to the electronic device that connects in operation 701, the wireless power transmitter may instruct a corresponding electronic device to perform wireless charging in operation 711. An electronic device may adjust wireless electrical energy based on the wireless charging impedance of the electronic device that instructs to perform wireless charging.

When it is not possible to supply wireless power to the electronic device that connects in operation 701, the wireless power transmitter may allocate a wireless charging priority to the electronic device based on when the electronic device connects in operation 705. In this case, the wireless power transmitter may allocate the wireless priority to the electronic device and control the electronic device so that it operates in a charging standby mode. For example, when the fourth electronic device 617 connects while the wireless power transmitter transmits wireless power corresponding to rated power capacity, the wireless power transmitter 600 may set the wireless charging priority of the fourth electronic device 617 to 1. When a fifth electronic device 619 further connects, the wireless power transmitter 600 may set the wireless charging priority of the fifth electronic device 619 to 2.

The wireless power transmitter may check whether it is possible to perform wireless charging on electronic devices that wait for charging in operation 707. For example, the wireless power transmitter may check whether there is a power capacity margin. For example, when there is an electronic device that disconnects among electronic devices on which wireless charging is being performed, the wireless power transmitter may recognize that there is a power capacity margin. For another example, the wireless power transmitter may also switch the mode of an electronic device having a battery state equal to or higher than a reference value to a charging standby mode to have a power capacity margin. For still another example, the wireless power transmitter may also switch an electronic device of which the charging operation is switched to the CV mode, to a charging standby mode to have a power capacity margin.

When it is not possible to perform wireless charging on an electronic device that waits for charging, the wireless power transmitter may check whether there is an electronic device that connects for wireless charging in operation 701.

When it is possible to perform wireless charging on an electronic device that waits for charging, the wireless power transmitter may determine on which electronic device wireless charging will be performed according to the wireless charging priority of at least one electronic device that waits for charging in operation 709. For example, the wireless power transmitter may select an electronic device having a highest wireless charging priority as an electronic device on which wireless charging will be performed. In this case, the wireless power transmitter may transmit a wireless charging instruction signal to an electronic device on which wireless charging will be performed.

FIGS. 8A to 8C show a configuration for allocating a wireless charging priority based on the battery state of the wireless power receiver according to an embodiment of the present disclosure.

Referring to FIG. 8A, the wireless power transmitter 800 may transmit wireless power to a plurality of electronic devices 811 to 815.

When a fourth electronic device 817 further connect to a wireless power transmitter 800 while the wireless power transmitter 800 uses rated power capacity, the wireless power transmitter 800 may control the fourth electronic device 817 so that it operates in a charging standby mode. The wireless power transmitter 800 may set a wireless charging priority based on the battery state of the fourth electronic device 817. For example, when there is no electronic device that waits for charging, the wireless power transmitter 800 may set the wireless charging priority of the fourth electronic device 817 to 1.

When a fifth electronic device 819 further connect to the wireless power transmitter 800 while the wireless power transmitter 800 uses rated power capacity as shown in FIG. 8B, the wireless power transmitter 800 may control the fifth electronic device 819 so that it operates in a charging standby mode. The wireless power transmitter 800 may re-set a wireless charging priority based on the battery state of the fifth electronic device 819. For example, when it is assumed that the battery state of the fourth electronic device 817 that waits for charging is 40% and the battery state of the fifth electronic device 819 is 10%, the wireless power transmitter 800 may set the wireless charging priority of the fifth electronic device 819 to 1 and change the wireless charging priority of the fourth electronic device 817 to 2.

As shown in FIG. 8C, when a second electronic device 813 is completely charged, the wireless power transmitter 800 may recognize that there is a power capacity margin. The wireless power transmitter 800 may control the fifth electronic device 819 having a highest priority between the electronic devices 817 and 819 waiting for charging so that the fifth electronic device 819 may perform wireless charging.

Figure 9:
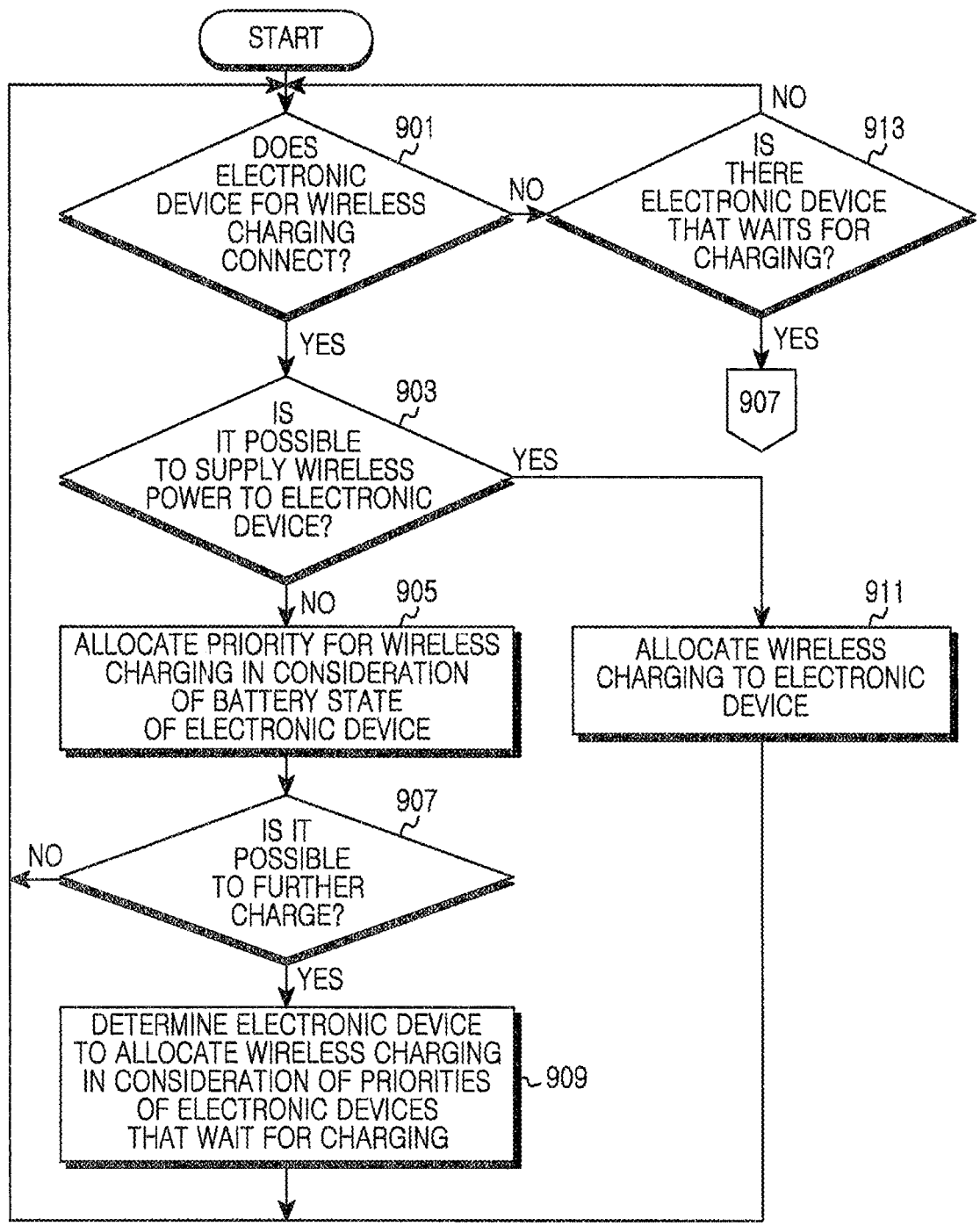
FIG. 9 shows a procedure for allocating a wireless charging priority based on the battery state of a wireless power receiver according to an embodiment of the present disclosure.

FIG. 9 shows a procedure for allocating a wireless charging priority based on the battery state of the wireless power receiver according to an embodiment of the present disclosure.

Referring to FIG. 9, the wireless power transmitter may check whether there is an electronic device that connects thereto for wireless charging in operation 901.

When there is no electronic device that connects for wireless charging, the wireless power transmitter may check whether there is an electronic device that waits for charging in operation 913.

When there is no electronic device that waits for charging, the wireless power transmitter may check whether there is an electronic device that connects for wireless charging in operation 901.

When there is an electronic device that waits for charging, the wireless power transmitter may check whether it is possible to perform wireless charging on the electronic device that waits for charging in operation 907.

When there is an electronic device that connects for wireless charging in operation 901, the wireless power transmitter may check whether it is possible to supply wireless power to the electronic device that connects in operation 903. For example, the wireless power transmitter may check whether it is possible to supply wireless power to a newly connected electronic device based on the number of electronic devices on which wireless charging is being performed. For another example, the wireless power transmitter may compare power capacity that may be further supplied from the wireless power transmitter, with wireless charging capacity needed by the newly connected electronic device, and check whether it is possible to supply wireless power to a corresponding electronic device. In this case, the wireless power transmitter may check power capacity that may be further supplied by checking power capacity being used for supplying wireless power based on one or more of the wireless charging capacity and wireless charging impedance of at least one electronic device on which wireless charging is being performed.

When it is possible to supply wireless power to the electronic device that connects in operation 903, the wireless power transmitter may instruct a corresponding electronic device to perform wireless charging in operation 911. In this case, the wireless power transmitter may adjust wireless electrical energy based on the wireless charging impedance of the electronic device that instructs to perform wireless charging.

When it is not possible to supply wireless power to the electronic device that connects in operation 903, the wireless power transmitter may allocate a wireless charging priority to the electronic device based on its battery state in operation 905. In this case, the wireless power transmitter may allocate the wireless priority to the electronic device and control the electronic device so that it operates in a charging standby mode. For example, when it is assumed that the fifth electronic device 819 that has a battery state of 10% connects while the fourth electronic device 817 that has a battery state of 40% waits for charging as shown in FIG. 8B, the wireless power transmitter 800 may set the wireless charging priority of the fifth electronic device 819 to 1 and change the wireless charging priority of the fourth electronic device 817 to 2.

The wireless power transmitter may check whether it is possible to perform wireless charging on the electronic device that waits for charging in operation 907. For example, the wireless power transmitter may check whether there is a power capacity margin. For example, when there is an electronic device that disconnects among electronic devices on which wireless charging is being performed, the wireless power transmitter may recognize that there is a power capacity margin. For another example, the wireless power transmitter may also switch the mode of an electronic device having a battery state equal to or higher than a reference value to a charging standby mode to have a power capacity margin. For still another example, the wireless power transmitter may also switch an electronic device of which the charging operation is switched to the CV mode, to a charging standby mode to have a power capacity margin.

When it is not possible to perform wireless charging on an electronic device that waits for charging, the wireless power transmitter may check whether there is an electronic device that connects for wireless charging in operation 901.

When it is possible to perform wireless charging on an electronic device that waits for charging, the wireless power transmitter may determine on which electronic device wireless charging will be performed according to the wireless charging priority of at least one electronic device that waits for charging in operation 909. For example, the wireless power transmitter may select an electronic having a highest wireless charging priority as an electronic device on which wireless charging will be performed. The wireless power transmitter may transmit a wireless charging instruction signal to an electronic device on which wireless charging will be performed.

As described above, when the wireless power transmitter has a power capacity margin, the wireless power transmitter may select an electronic device on which wireless charging will be subsequently performed, based on the wireless charging priority of at least one electronic device that waits for charging. In this case, the wireless power transmitter may have a power capacity margin in consideration of the battery state of an electronic device on which wireless charging is being performed in the case of FIGS. 10A and 10B or may have the power capacity margin based on the charging operation of the electronic device on which wireless charging is being performed in the case of FIGS. 12A and 12B.

FIGS. 10A and 10B show a configuration for changing a wireless charging priority based on the battery state of the wireless power receiver according to an embodiment of the present disclosure.

Referring to FIG. 10A, a wireless power transmitter 1000 may use rated power capacity for transmitting wireless power to a first electronic device 1011, a second electronic device 1013, and a third electronic device 1015 and thus allow a fourth electronic device 1017 and a fifth electronic device 1019 to operate in a charging standby mode. The wireless power receiver 1000 may set a wireless charging priority based on the connection times or battery states of the fourth electronic device 1017 and the fifth electronic device 1019.

The wireless power receiver 1000 may change the wireless charging priorities of electronic devices based on the battery states of the electronic devices 1011 to 1015 on which wireless charging is being performed. For example, as shown in FIG. 10B, when the battery state of the second electronic device 1013 on which wireless charging is being performed is equal to or higher than a reference value (e.g., 90%), the wireless power transmitter 1000 may allow the mode of the second electronic device 1013 to be switched to a charging standby mode. In this case, the wireless power transmitter 1000 may perform wireless charging on the fifth electronic device 1019 having a highest wireless charging priority between the fourth electronic device 1017 and the fifth electronic device 1019 that waits for charging, according to the power capacity margin caused when the mode of the second electronic device 1013 is switched to the charging standby mode. For example, the wireless power transmitter 1000 may transmit a wireless charging instruction signal to the fifth electronic device 1019.

Figure 11:
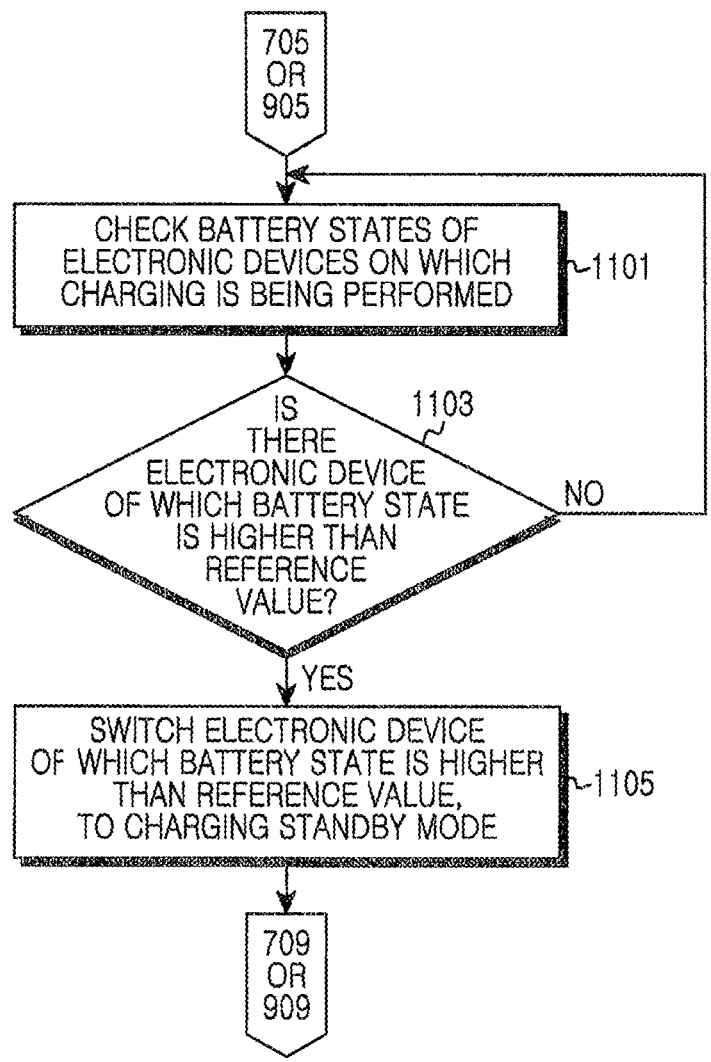
FIG. 11 shows a procedure for changing a wireless charging priority based on the battery state of a wireless power receiver according to an embodiment of the present disclosure.

FIG. 11 shows a procedure for changing a wireless charging priority based on the battery state of the wireless power receiver according to an embodiment of the present disclosure.

Referring to FIG. 11, when the wireless power transmitter allocates a wireless charging priority to at least one electronic device that waits for charging in operation 705 of FIG. 7 or in operation 905 of FIG. 9, the wireless power transmitter may check the battery state of at least one electronic device on which wireless charging is being performed in operation 1101. For example, through power information provided from the electronic device on which wireless charging is being performed, the wireless power transmitter may check the battery state of a corresponding electronic device. For another example, the wireless power transmitter may request at least one electronic device on which wireless charging is being performed, to transmit power information. Through the power information provided from the electronic device on which wireless charging is being performed in response to the request for power information, the wireless power transmitter may check the battery state of a corresponding electronic device.

The wireless power transmitter may check whether there is an electronic device having a battery state higher than a reference value in operation 1103.

When there is no electronic device having the battery state higher than the reference value, the wireless power transmitter may check the battery state of at least one electronic device on which wireless charging is being performed in operation 1101. For example, the wireless power transmitter may continue to perform a wireless charging operation.

When there is at least one electronic device having the battery state higher than the reference value, the wireless power transmitter may control the electronic device having the battery state higher than the reference value so that its mode is switched to a charging standby mode. For example, the wireless power transmitter may transmit a charging standby mode switch request signal to at least one electronic device having the battery state higher than the reference value.

As described above, when switching the mode of at least one of electronic devices on which wireless charging is being performed to a charging standby mode, the wireless power transmitter may recognize that there is a power capacity margin due to at least one electronic device switched to the charging standby mode. The wireless power transmitter may determine on which electronic device wireless charging will be performed, according to the wireless charging priority of at least one electronic device that waits for charging in operation 709 of FIG. 7 or in operation 909 of FIG. 9.

Figure 12B:
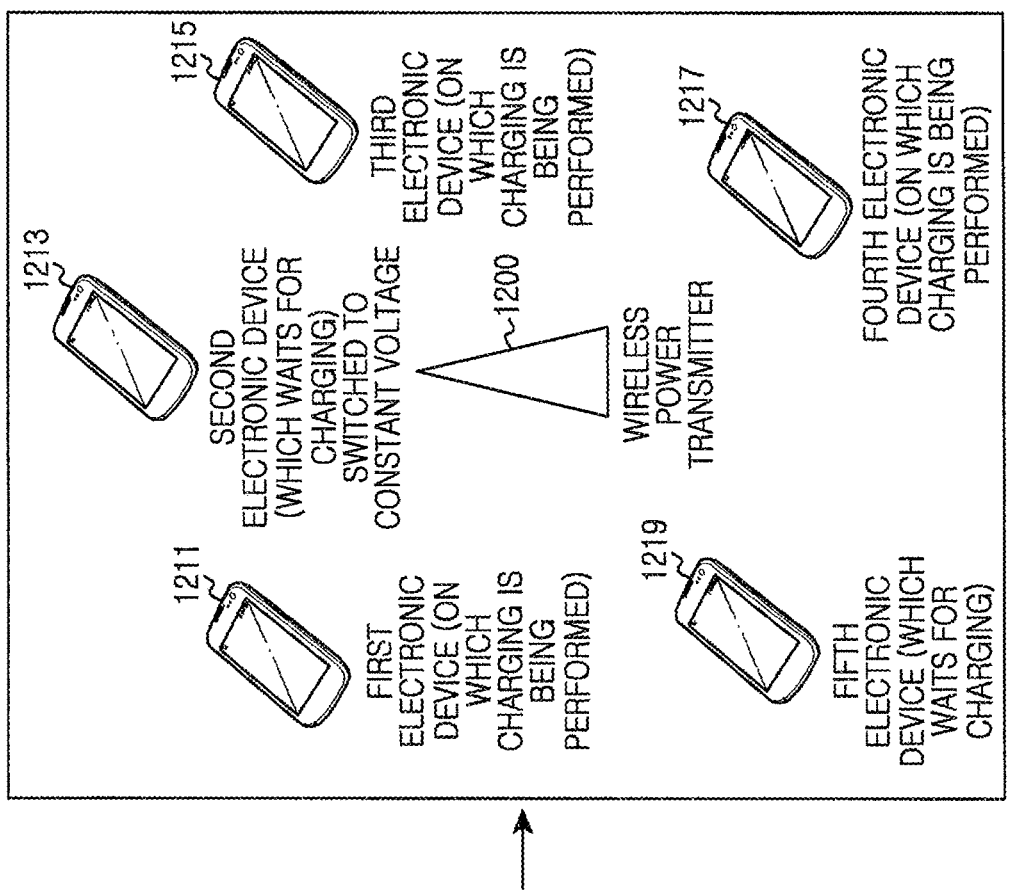
FIGS. 12A and 12B show a configuration for changing a wireless charging priority based on the charging operation of a wireless power receiver according to an embodiment of the present disclosure.
Figure 12A:
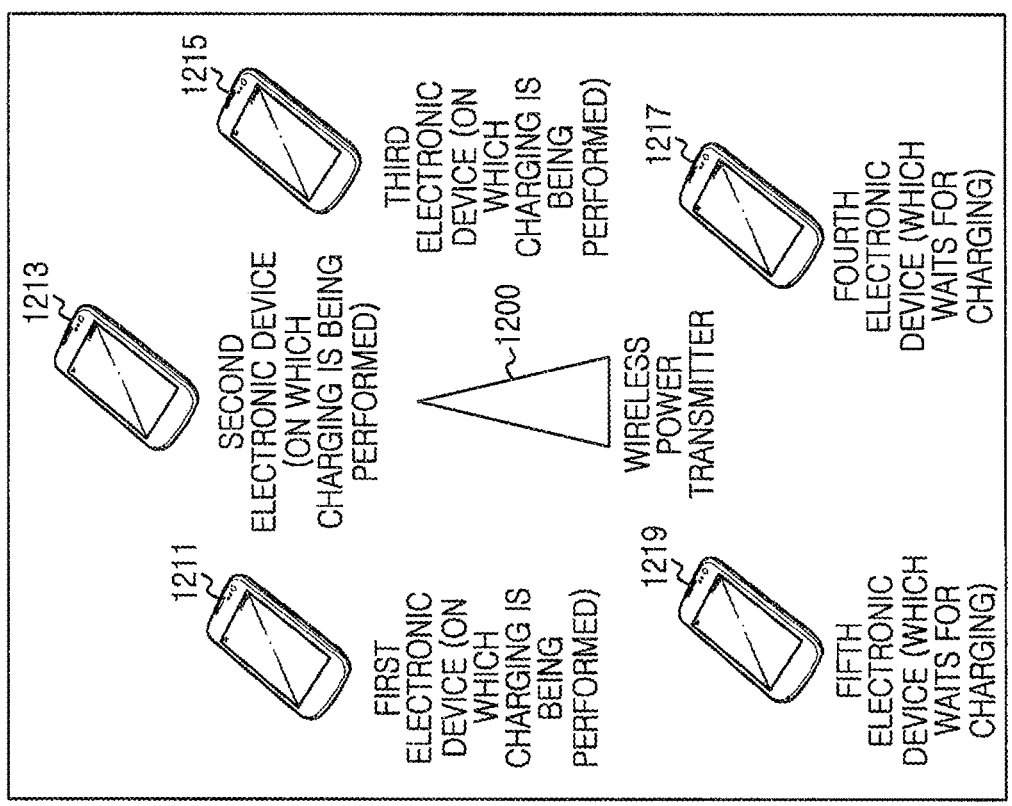

FIGS. 12A and 12B show a configuration for changing a wireless charging priority based on the charging operation of the wireless power receiver according to an embodiment of the present disclosure.

Referring to FIG. 12A, a wireless power transmitter 1200 may use rated power capacity for transmitting wireless power to a first electronic device 1211, a second electronic device 1213, and a third electronic device 1215 and thus allow a fourth electronic device 1217 and a fifth electronic device 1219 to operate in a charging standby mode. In this case, the wireless power receiver 1200 may set a wireless charging priority based on the connection times or battery states of the fourth electronic device 1217 and the fifth electronic device 1219.

The wireless power transmitter 1200 may change the wireless charging priorities of electronic devices based on the charging operations of the electronic devices 1211 to 1215 on which wireless charging is being performed. For example, the electronic devices 1211 to 1215 may switch their charging operations to a CV mode in order to prevent the overcharging of batteries, when battery states exceed a reference value during charging. If at least one electronic device (ex. electronic device 1213) of the electronic devices 1211 to 1215 is switched to the CV mode during wireless charging through the wireless power transmitter 1200, the wireless power transmitter 1200 may gradually decrease currents transmitted for the wireless charging of the at least one electronic device that operates in the CV mode. For example, when the second electronic device 1213 on which wireless charging is being performed is switched to the CV mode as shown in FIG. 12B, the wireless power transmitter 1200 may control the second electronic device 1213 so that it is switched to a charging standby mode. The wireless power transmitter 1200 may perform wireless charging on the fourth electronic device 1217 having a highest wireless charging priority between the fourth electronic device 1217 and the fifth electronic device 1219 that wait for charging, according to a power capacity margin caused when the second electronic device 1213 is switched to the charging standby mode. For example, the wireless power transmitter 1200 may transmit a wireless charging instruction signal to the fourth electronic device 1217.

Figure 13:
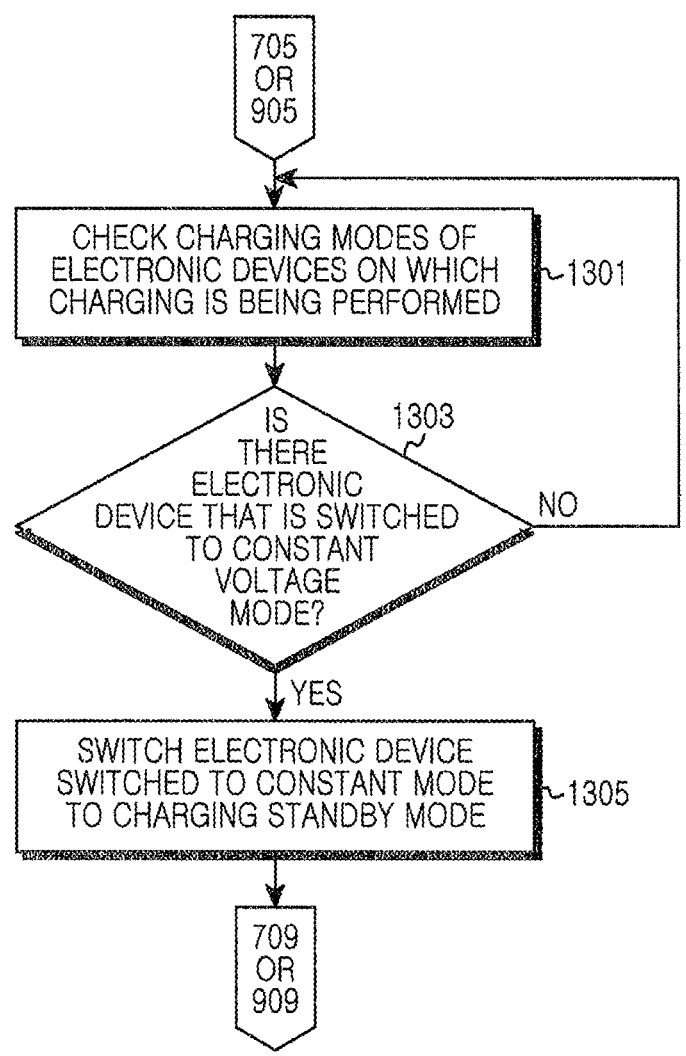
FIG. 13 shows a procedure for changing a wireless charging priority based on the charging operation of a wireless power receiver according to an embodiment of the present disclosure.

FIG. 13 shows a procedure for changing a wireless charging priority based on the charging operation of the wireless power receiver according to an embodiment of the present disclosure.

Referring to FIG. 13, when the wireless power transmitter allocates a wireless charging priority to at least one electronic device that waits for charging in operation 705 of FIG. 7 or in operation 905 of FIG. 9, the wireless power transmitter may check the charging operation of at least one electronic device on which wireless charging is being performed in operation 1301. For example, through power information provided from the electronic device on which wireless charging is being performed, the wireless power transmitter may check the charging operation of a corresponding electronic device. For another example, the wireless power transmitter may request at least one electronic device on which wireless charging is being performed, to transmit power information. Through the power information provided from the electronic device on which wireless charging is being performed in response to the request for power information or the wireless charging impedance change of the wireless power transmitter appearing when changing the charging operation mode of at least one electronic device on which wireless charging is being performed, it is possible to check the charging operation of a corresponding electronic device The wireless power transmitter may check whether there is an electronic device of which the charging operation is switched to the CV mode in operation 1303.

When there is no electronic device switched to the CV mode, the wireless power transmitter may check the charging operation of at least one electronic device on which wireless charging is being performed in operation 1301. For example, the wireless power transmitter may continue to perform a wireless charging operation.

When there is at least one electronic device switched to the CV mode, the wireless power transmitter may control at least one electronic device switched to the CV mode so that the device is switched to a charging standby mode in operation 1305. For example, the wireless power transmitter may transmit a charging standby mode switch request signal to at least one electronic device switched to the CV mode.

As described above, when switching at least one of electronic devices on which wireless charging is being performed to a charging standby mode, the wireless power transmitter may recognize that there is a power capacity margin due to at least one electronic device switched to the charging standby mode. The wireless power transmitter may determine on which electronic device wireless charging will be performed, according to the wireless charging priority of at least one electronic device that waits for charging in operation 709 of FIG. 7 or in operation 909 of FIG. 9.

In the embodiment described above, the wireless power transmitter may control at least one electronic device so that it is switched to a charging standby mode, based on the battery state or charging operation of an electronic device on which wireless charging is being performed, to have a power capacity margin.

Figure 14:
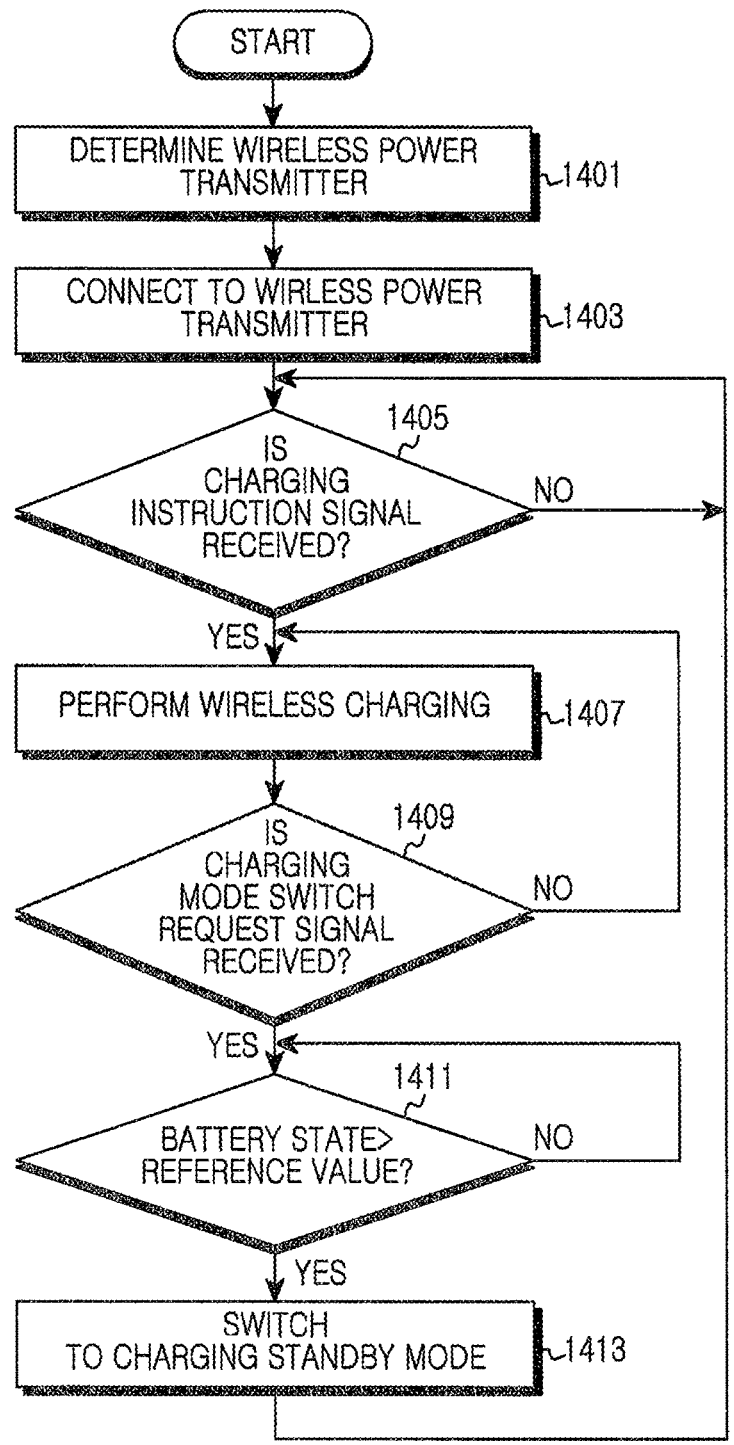
FIG. 14 shows a procedure for switching a wireless charging mode based on the battery state of a wireless power receiver according to an embodiment of the present disclosure.
Figure 15:
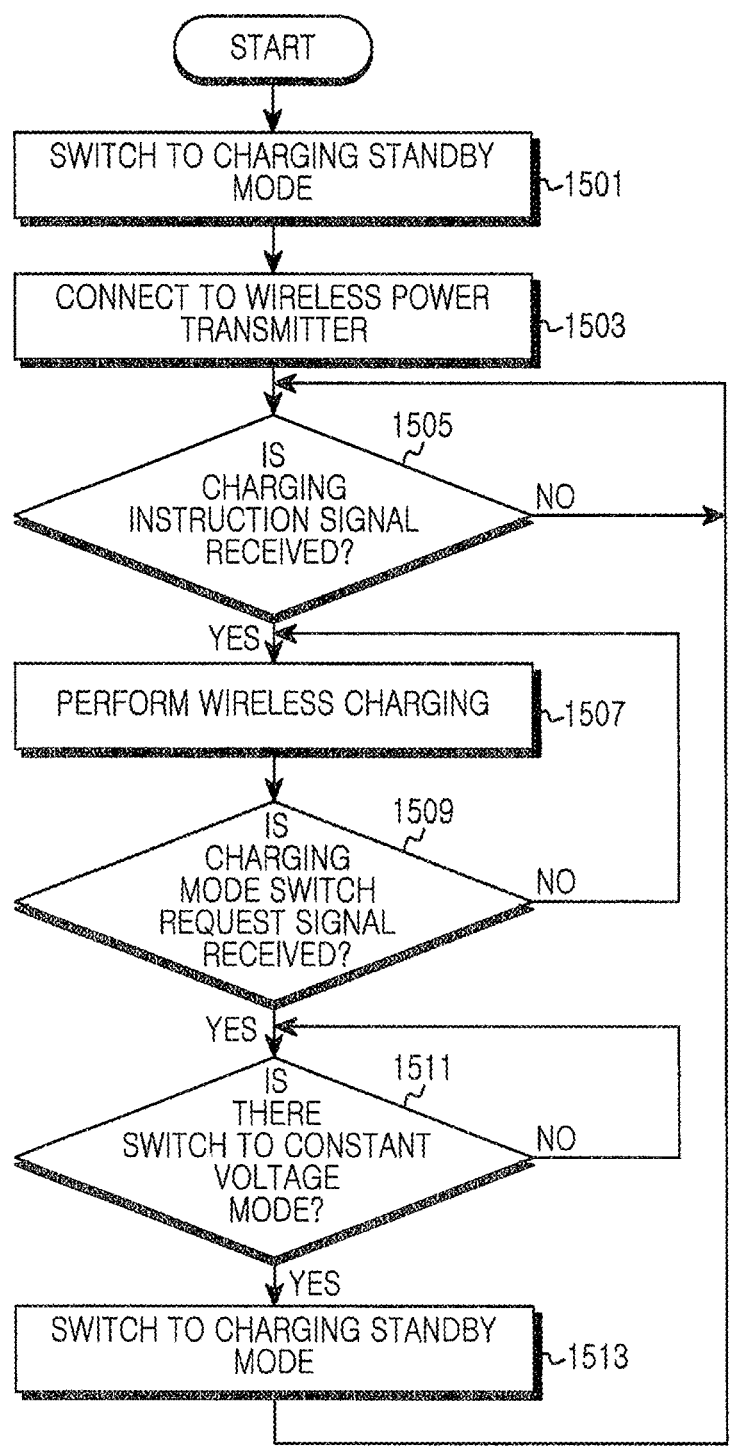
FIG. 15 shows a procedure for switching a wireless charging mode based on the charging operation of a wireless power receiver according to an embodiment of the present disclosure.

In another embodiment, the electronic device may also be switched to the charging standby mode autonomously based on a battery state or a charging operation during wireless charging as shown in FIG. 14 or 15.

FIG. 14 shows a procedure for switching a wireless charging mode based on the battery state of the wireless power receiver according to an embodiment of the present disclosure.

Referring to FIG. 14, the wireless power receiver may determine a wireless power transmitter in operation 1401. For example, the wireless power receiver may determine at least one wireless power transmitter based on the intensity of a reference signal received from one or more wireless power transmitters.

The wireless power receiver may connect to the wireless power transmitter in operation 1403. For example, the wireless power receiver may transmit a connection request signal to the wireless power transmitter determined in operation 1401. When receiving a connection approval signal from the wireless power transmitter, the wireless power receiver may recognize that it connects to the wireless power transmitter. For another example, the wireless power receiver may receive the connection request signal from the wireless power transmitter determined in operation 1401. When receiving the connection request signal from the wireless power transmitter, the wireless power receiver may recognize that it connects to the wireless power transmitter.

The wireless power receiver may check whether a charging instruction signal is received from the wireless power transmitter in operation 1405.

When the charging instruction signal is not received from the wireless power transmitter, the wireless power receiver may check whether the charging instruction signal is received from the wireless power transmitter while operating in a charging standby mode. If the wireless power receiver fails to receive the charging instruction signal for a reference time, the wireless power receiver may recognize that wireless charging through the wireless power transmitter is not possible, and may be disconnected from the wireless power transmitter.

When the charging instruction signal is received from the wireless power transmitter, the wireless power receiver may proceed to operation 1407, receive wireless power from the wireless power transmitter and charge a battery.

The wireless power receiver may check whether a charging mode switch request signal is received from the wireless power transmitter in operation 1409.

When the wireless power receiver fails to receive a charging mode switch request signal from the wireless power transmitter, the wireless power receiver may receive wireless power from the wireless power transmitter and charge a battery in operation 1407. In this case, when the battery is completely charged, the wireless power receiver may be disconnected from the wireless power transmitter.

When receiving the charging mode switch request signal from the wireless power transmitter, the wireless power receiver may check whether a battery state is higher than a reference value in operation 1411. In this example, the reference value may be preset or provided from the wireless power transmitter through a charging standby switch request signal.

When the battery state is lower than or equal to the reference value in operation 1411, the wireless power receiver may receive wireless power from the wireless power transmitter and continue to compare the battery state with the reference value while charging the battery.

When the battery state is higher than the reference value in operation 1411, the wireless power receiver may be switched to a charging standby mode in operation 1413. For example, the wireless power receiver may transmit a charging standby mode switch request signal to the wireless power transmitter.

In the embodiment described above, when receiving a charging standby switch request signal from the wireless power transmitter, the wireless power receiver may be switched to the charging standby mode when the battery state becomes higher than the reference value.

In another embodiment, when receiving the charging standby switch request signal from the wireless power transmitter, the wireless power receiver may be disconnected from the wireless power transmitter when the battery state becomes higher than the reference value. The wireless power receiver may connect to another wireless power transmitter and perform wireless charging.

FIG. 15 shows a procedure for switching a wireless charging mode based on the charging operation of a wireless power receiver according to an embodiment of the present disclosure.

Referring to FIG. 15, the wireless power receiver may determine a wireless power transmitter in operation 1501. For example, the wireless power receiver may determine at least one wireless power transmitter based on the intensity of a reference signal received from one or more wireless power transmitters.

The wireless power receiver may connect to the wireless power transmitter in operation 1503. For example, the wireless power receiver may transmit a connection request signal to the wireless power transmitter determined in operation 1501. Then, when receiving a connection approval signal from the wireless power transmitter, the wireless power receiver may recognize that it connects to the wireless power transmitter. For another example, the wireless power receiver may receive the connection request signal from the wireless power transmitter determined in operation 1501. When receiving the connection request signal from the wireless power transmitter, the wireless power receiver may recognize that it connects to the wireless power transmitter.

The wireless power receiver may check whether a charging instruction signal is received from the wireless power transmitter in operation 1505.

When the charging instruction signal is not received from the wireless power transmitter, the wireless power receiver may check whether the charging instruction signal is received from the wireless power transmitter while operating in a charging standby mode. If the wireless power receiver fails to receive the charging instruction signal for a reference time, the wireless power receiver may recognize that wireless charging through the wireless power transmitter is not possible, and may be disconnected from the wireless power transmitter.

When the charging instruction signal is received from the wireless power transmitter, the wireless power receiver may receive wireless power from the wireless power transmitter and charge a battery in operation 1507.

The wireless power receiver may check whether a charging mode switch request signal is received from the wireless power transmitter in operation 1509.

When the wireless power receiver fails to receive a charging mode switch request signal from the wireless power transmitter, the wireless power receiver may receive wireless power from the wireless power transmitter and charge a battery in operation 1507. When the battery is completely charged, the wireless power receiver may be disconnected from the wireless power transmitter.

When receiving the charging mode switch request signal from the wireless power transmitter, the wireless power receiver may check whether a charging operation is switched to a CV mode in operation 1511.

When the charging operation is not switched to the CV mode in operation 1511, the wireless power receiver may receive wireless power from the wireless power transmitter and check whether the charging operation is switched to the CV mode while charging the battery.

When the charging operation is switched to the CV mode in operation 1511, the wireless power receiver may be switched to a charging standby mode in operation 1513. For example, the wireless power receiver may transmit a charging standby mode switch request signal to the wireless power transmitter.

In the embodiment described above, when receiving a charging standby switch request signal from the wireless power transmitter, the wireless power receiver may be switched to the charging standby mode when the charging operation is switched to the CV mode.

In another embodiment, when receiving the charging standby switch request signal from the wireless power transmitter, the wireless power receiver may be disconnected from the wireless power transmitter when the charging operation is switched to the CV mode. In this case, the wireless power receiver may connect to another wireless power transmitter and perform wireless charging.

In the embodiment described above, the wireless power receiver may be switched to the charging standby mode based on a battery state or a charging operation according to the charging standby switch request signal from the wireless power transmitter during wireless charging.

In another embodiment, when receiving priority allocation information from the wireless power transmitter, the wireless power receiver may operate in the charging standby mode. When a charging instruction signal is received from the wireless power transmitter while operating in the charging standby mode, the wireless power receiver may perform wireless charging.

In still another embodiment, when receiving information representing that the wireless power transmitter has a power capacity margin while operating in the charging standby mode, the wireless power receiver may perform wireless charging based on a wireless charging priority. For example, the wireless power receiver may perform wireless charging according to the information representing that the power capacity of the wireless power transmitter has a power capacity margin, when its wireless charging priority is highest.

Figure 16:
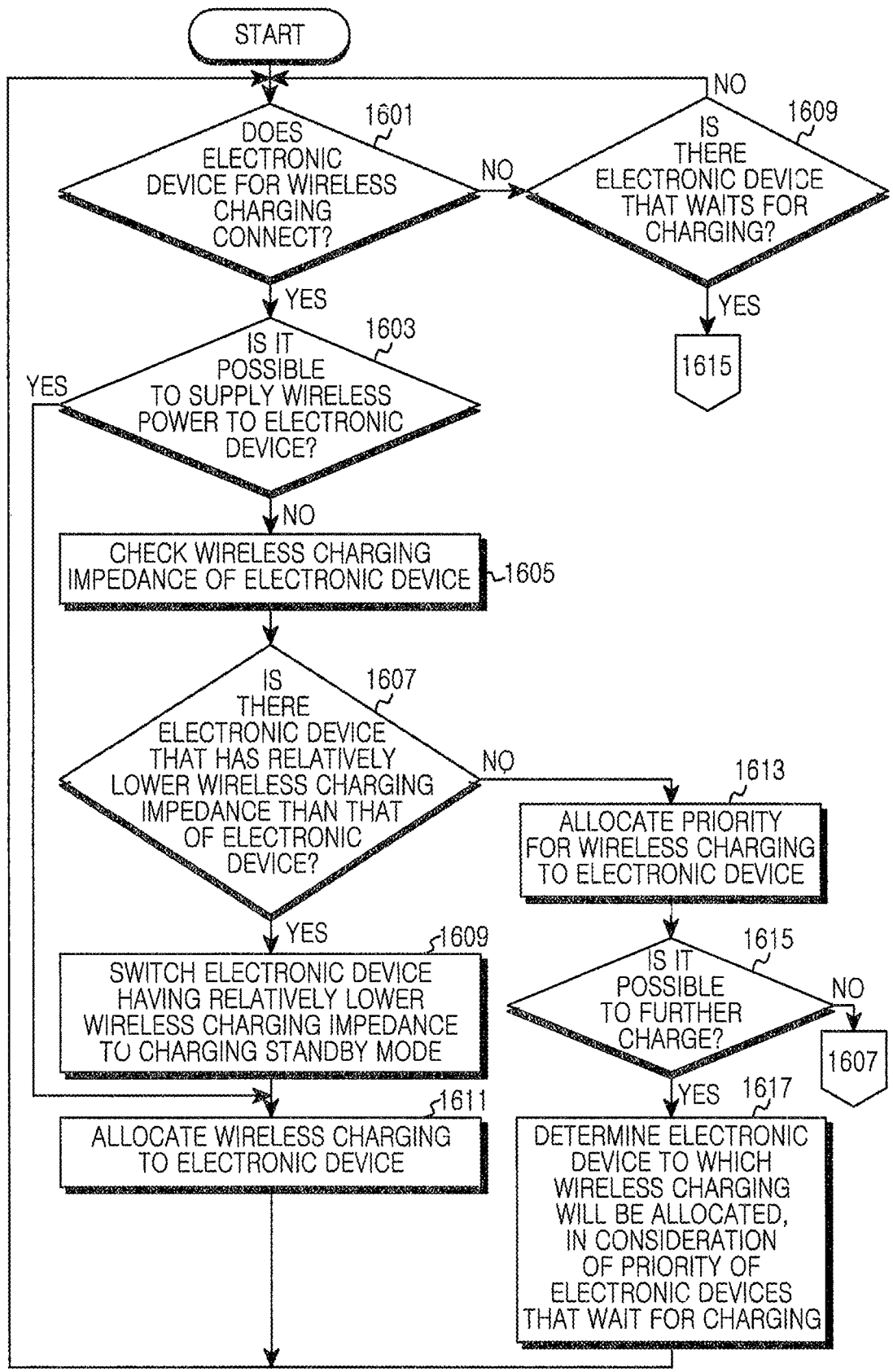
FIG. 16 shows a procedure for allocating a wireless charging priority based on the wireless charging impedance of a wireless power receiver according to an embodiment of the present disclosure.

FIG. 16 shows a procedure for allocating a wireless charging priority based on the wireless charging impedance of the wireless power receiver according to an embodiment of the present disclosure.

Referring to FIG. 16, the wireless power transmitter may check whether there is an electronic device that connects thereto for wireless charging in operation 1601.

When there is no electronic device that connects for wireless charging, the wireless power transmitter may check whether there is an electronic device that waits for charging in operation 1619.

When there is no electronic device that waits for charging, the wireless power transmitter may check whether there is an electronic device that connects for wireless charging in operation 1601.

When there is an electronic device that waits for charging, the wireless power transmitter may check whether it is possible to perform wireless charging on the electronic device that waits for charging in operation 1615.

When there is an electronic device that connects for wireless charging in operation 1601, the wireless power transmitter may check whether it is possible to supply wireless power to the electronic device that connects in operation 1603. For example, the wireless power transmitter may check whether it is possible to supply wireless power to a newly connected electronic device based on the number of electronic devices on which wireless charging is being performed. For another example, the wireless power transmitter may compare power capacity that may be further supplied from the wireless power transmitter, with wireless charging capacity needed by the newly connected electronic device, and check whether it is possible to supply wireless power to a corresponding electronic device. In this case, the wireless power transmitter may check power capacity that may be further supplied by checking power capacity being used for supplying wireless power based on one or more of the wireless charging capacity and wireless charging impedance of at least one electronic device on which wireless charging is being performed.

When it is possible to supply wireless power to the electronic device that connects in operation 1603, the wireless power transmitter may instruct a corresponding electronic device to perform wireless charging in operation 1611. In this case, the wireless power transmitter may adjust wireless electrical energy based on the wireless charging impedance of the electronic device that is instructed to perform wireless charging.

When it is not possible to supply wireless power to the electronic device that connects in operation 1603, the wireless power transmitter may check the wireless charging impedance of the newly connected electronic device in operation 1605.

The wireless power transmitter may check whether there is an electronic device that has a lower wireless charging impedance than that of the newly connected electronic device among electronic devices on which wireless charging is being performed in operation 1607.

When there is an electronic device that has a relatively lower wireless charging impedance than that of the newly connected electronic device, the wireless power transmitter may switch, to a charging standby mode, an electronic device having a relatively lower wireless charging impedance than that of the newly connected electronic device in operation 1609. For example, the wireless power transmitter may supply wireless power to be able to satisfy the relatively lowest wireless charging impedance among wireless charging impedances of electronic devices on which wireless charging is being performed. For example, when an electronic device having a relatively low wireless charging impedance connects, the wireless power transmitter may decrease the wireless charging efficiency of another electronic device. In order to increase wireless charging efficiency, the wireless power transmitter may switch, to the charging standby mode, the electronic device having the relatively low wireless charging impedance. The wireless power transmitter may transmit a charging standby mode switch request signal to the electronic device having the relatively low wireless charging impedance.

The wireless power transmitter may instruct an electronic device to perform wireless charging in operation 1611. For example, the wireless power transmitter may instruct the electronic device that connects in operation 1601, to perform wireless charging in operation 1601. The wireless power transmitter may adjust wireless electrical energy based on the wireless charging impedance of the electronic device that is instructed to perform wireless charging.

When there is no electronic device that has a wireless charging impedance lower than that of the newly connected electronic device in operation 1607, the wireless power transmitter may allocate a wireless charging priority to the electronic device in operation 1613. In this case, the wireless power transmitter may transmit information of the wireless charging priority to the electronic device. For example, the wireless power transmitter may set a wireless charging priority based on the connection time of battery state of the electronic device.

The wireless power transmitter may check whether it is possible to perform wireless charging on the electronic device that waits for charging in operation 1615. For example, the wireless power transmitter may check whether there is a power capacity margin. For example, when there is an electronic device that is disconnected from the wireless power transmitter among electronic devices on which wireless charging is being performed, the wireless power transmitter may recognize that there is a power capacity margin. For another example, the wireless power transmitter may also switch an electronic device having a battery state equal to or higher than a reference value to a charging standby mode to have a power capacity margin. For still another example, the wireless power transmitter may also switch an electronic device of which the charging operation is switched to a CV mode, to a charging standby mode to have a power capacity margin.

When it is not possible to perform wireless charging on an electronic device that waits for charging, the wireless power transmitter may check whether there is an electronic device that connects for wireless charging in operation 1601.

When it is possible to perform wireless charging on an electronic device that waits for charging, the wireless power transmitter may determine on which electronic device wireless charging will be performed, according to the wireless charging priority of at least one electronic device that waits for charging in operation 1617. For example, the wireless power transmitter may select an electronic having a highest wireless charging priority as an electronic device on which wireless charging will be performed. The wireless power transmitter may transmit a wireless charging instruction signal to an electronic device on which wireless charging will be performed.

In the embodiment described above, the wireless power transmitter may switch an electronic device having a relatively lower wireless charging impedance than that of a newly connected electronic device to a charging standby mode to have a power capacity margin. When there is a plurality of electronic devices that has a relatively lower wireless charging impedance than that of the newly connected electronic device, the wireless power transmitter may switch, to the charging standby mode, an electronic device having the relatively lowest wireless charging impedance among the plurality of electronic devices that has the relatively lower wireless charging impedance than that of the newly connected electronic device.

According to various embodiments of the present disclosure, by setting and controlling a wireless charging priority according to the state of an electronic device connecting for wireless charging by the wireless power transmitter, it is possible to efficiently transmit power for wireless charging to the plurality of electronic devices.

While particular embodiments have been described in the detailed description of the present disclosure, the steps of an electronic device may be changed in order, integrated or re-used and several variations such as removal may be made without departing from the scope of the present disclosure. Therefore, the scope of the present disclosure should not be limited to the above-described embodiments but be defined by the following claims and equivalents thereof.

What is claimed is:

1. A wireless power transmitter comprising:
a power transmission unit configured to have a first power capacity;
a communication unit; and
a control module configured to:
supply wireless power corresponding to a second power capacity to one or more electronic devices through the power transmission unit,
while supplying the wireless power corresponding to the second power capacity, identify a third power capacity corresponding to at least one first electronic device based on information related to wireless charging received from the at least one first electronic device through the communication unit,
determine whether it is possible to supply wireless power corresponding to the third power capacity to the at least one first electronic device by comparing the first power capacity with a sum of the second power capacity and the third power capacity, and
if it is not possible to supply the wireless power corresponding to the third power capacity to the at least one first electronic device, allocate priorities to the one or more electronic devices and the at least one first electronic device, and supply wireless power to at least one electronic device among the one or more electronic devices and the at least one first electronic device based on the priorities, and
if it is possible to supply the wireless power corresponding to the third power capacity to the at least one first electronic device, supply wireless power to the one or more electronic devices and the at least one first electronic device through the power transmission unit without allocating the priorities to the one or more electronic devices and the at least one first electronic device.

2. The wireless power transmitter of claim 1, wherein the control module is further configured to:
while supplying the wireless power to the at least one electronic device among the one or more electronic devices and the at least one first electronic device, receive another information related to wireless charging of at least one second electronic device through the communication unit, and
transmit a signal for requesting to switch to a charging standby mode to the at least one second electronic device through the communication unit based on the other information.

3. The wireless power transmitter of claim 1, wherein the control module is further configured to:
when a second electronic device of the at least one electronic device among the one or more electronic devices and the at least one first electronic device is charged to a battery state higher than a reference value, transmit a signal for requesting to switch to a charging mode to a third electronic device of at least another electronic device among the one or more electronic devices and the at least one first electronic device.

4. The wireless power transmitter of claim 1, wherein the control module is further configured to:
while supplying the wireless power to the one or more electronic devices and the at least one first electronic device, receive another information related to wireless charging of at least one second electronic device through the communication unit,
determine a fourth power capacity corresponding to the at least one second electronic device based on the other information, and
determine whether it is possible to supply wireless power corresponding to the fourth power capacity to the at least one second electronic device by comparing the first power capacity with a sum of the second power capacity, the third power capacity and the fourth power capacity.

5. The wireless power transmitter of claim 4, wherein the control module is further configured to:
if it is not possible to supply the wireless power corresponding to the fourth power capacity to the at least one second electronic device, allocate other priorities to the one or more electronic devices, the at least one first electronic device and the at least one second electronic device, and supply wireless power to at least one electronic device among the one or more electronic devices, the at least one first electronic device and the at least one second electronic device based on the other priorities, and
if it is possible to supply the wireless power corresponding to the fourth power capacity to the at least one second electronic device, supply wireless power to the one or more electronic devices, the at least one first electronic device and the at least one second electronic device through the power transmission unit without allocating the other priorities to the one or more electronic devices, the at least one first electronic device and the at least one second electronic device.

6. The wireless power transmitter of claim 1, wherein the control module is further configured to:
when a charging mode of a second electronic device of the at least one electronic device among the one or more electronic devices and the at least one first electronic device is switched to a constant voltage (CV) mode, transmit a signal for requesting to switch to a charging standby mode to the second electronic device through the communication unit.

7. A wireless power transmitter comprising:
a power transmission unit configured to have a first power capacity;
a communication unit; and
a control module configured to:
supply wireless power corresponding to a second power capacity to one or more electronic devices through the power transmission unit,
while supplying the wireless power corresponding to the second power capacity, identify a third power capacity corresponding to a plurality of first electronic devices based on information related to wireless charging received from the plurality of first electronic devices through the communication unit,
determine whether it is possible to supply wireless power corresponding to the third power capacity to the plurality of first electronic devices by comparing the first power capacity with a sum of the second power capacity and the third power capacity, and if it is not possible to supply the wireless power corresponding to the third power capacity to the plurality of first electronic devices, allocate priorities to the plurality of first electronic devices, and supply wireless power to the one or more electronic devices and at least one electronic device of the plurality of first electronic devices based on the priorities, and if it is possible to supply the wireless power corresponding to the third power capacity to the plurality of first electronic devices, supply wireless power to the one or more electronic devices and the plurality of first electronic devices through the power transmission unit without allocating the priorities to the plurality of first electronic devices.

8. The wireless power transmitter of claim 7, wherein the control module is further configured to:
allocate the priorities to the plurality of first electronic devices based on connection time of the plurality of first electronic devices.

9. The wireless power transmitter of claim 7, wherein the control module is further configured to:
while supplying the wireless power to the one or more electronic devices and the at least one electronic device of the plurality of first electronic devices, receive another information related to wireless charging of a second electronic device through the communication unit, and
transmit a signal for requesting to switch to a charging standby mode to the second electronic device through the communication unit based on the other information.

10. The wireless power transmitter of claim 7, wherein the control module is further configured to:
when a second electronic device among the one or more electronic devices and the at least one electronic device of the plurality of first electronic devices is charged to a battery state higher than a reference value, transmit a signal for requesting to switch to a charging mode to a third electronic device among the one or more electronic devices and the at least one electronic device of the plurality of first electronic devices.

11. The wireless power transmitter of claim 7, wherein the control module is further configured to:
while supplying the wireless power to the one or more electronic devices and the plurality of first electronic devices, receive another information related to wireless charging of a second electronic device through the communication unit,
determine a fourth power capacity corresponding to the second electronic device based on the other information, and
determine whether it is possible to supply wireless power corresponding to the fourth power capacity to the second electronic device by comparing the first power capacity with a sum of the second power capacity, the third power capacity and the fourth power capacity.

12. The wireless power transmitter of claim 11, wherein the control module is further configured to:
if it is not possible to supply the wireless power corresponding to the fourth power capacity to the second electronic device, allocate other priorities to the plurality of first electronic devices and the second electronic device, and supply wireless power to the one or more electronic devices and at least one electronic device among the plurality of first electronic devices and the second electronic device based on the other priorities, and if it is possible to supply the wireless power corresponding to the fourth power capacity to the second electronic device, supply wireless power to the one or more electronic devices, the plurality of first electronic devices and the second electronic device through the power transmission unit without allocating the other priorities to the plurality of first electronic devices and the second electronic device.

13. The wireless power transmitter of claim 7, wherein the control module is further configured to:
when a charging mode of a second electronic device among the one or more electronic devices and the at least one electronic device of the plurality of first electronic devices is switched to a constant voltage (CV) mode, transmit a signal for requesting to switch to a charging standby mode to the second electronic device through the communication unit.

14. A wireless power transmitter comprising:
a power transmission unit configured to have a first power capacity;
a communication unit; and
a control module configured to:
supply wireless power corresponding to a second power capacity to one or more electronic devices through the power transmission unit,
while supplying the wireless power corresponding to the second power capacity, identify a third power capacity corresponding to at least one first electronic device based on information related to wireless charging received from the at least one first electronic device through the communication unit,
determine whether it is possible to supply wireless power corresponding to the third power capacity to the at least one first electronic device by comparing the first power capacity with a sum of the second power capacity and the third power capacity, and
if it is not possible to supply the wireless power corresponding to the third power capacity to the at least one first electronic device, allocate priorities to the one or more electronic devices and the at least one first electronic device, and supply wireless power to at least one electronic device among the one or more electronic devices and the at least one first electronic device based on the priorities, and
if it is possible to supply the wireless power corresponding to the third power capacity to the at least one first electronic device, supply wireless power to the one or more electronic devices and the at least one first electronic device through the power transmission unit.

15. The wireless power transmitter of claim 14, wherein the control module is further configured to:
while supplying the wireless power to the at least one electronic device among the one or more electronic devices and the at least one first electronic device, receive another information related to wireless charging of at least one second electronic device through the communication unit, and
transmit a signal for requesting to switch to a charging standby mode to the at least one second electronic device through the communication unit based on the other information.

16. The wireless power transmitter of claim 14, wherein the control module is further configured to:
when a second electronic device of the at least one electronic device among the one or more electronic devices and the at least one first electronic device is charged to a battery state higher than a reference value, transmit a signal for requesting to switch to a charging mode to a third electronic device of at least another electronic device among the one or more electronic devices and the at least one first electronic device.

17. The wireless power transmitter of claim 14, wherein the control module is further configured to:
while supplying the wireless power to the one or more electronic devices and the at least one first electronic device, receive another information related to wireless charging of at least one second electronic device through the communication unit,
determine a fourth power capacity corresponding to the at least one second electronic device based on the other information, and
determine whether it is possible to supply wireless power corresponding to the fourth power capacity to the at least one second electronic device by comparing the first power capacity with a sum of the second power capacity, the third power capacity and the fourth power capacity.

18. The wireless power transmitter of claim 17 wherein the control module is further configured to:
if it is not possible to supply the wireless power corresponding to the fourth power capacity to the at least one second electronic device, allocate other priorities to the one or more electronic devices, the at least one first electronic device and the at least one second electronic device, and supply wireless power to at least one electronic device among the one or more electronic devices, the at least one first electronic device and the at least one second electronic device based on the other priorities, and
if it is possible to supply the wireless power corresponding to the fourth power capacity to the at least one second electronic device, supply wireless power to the one or more electronic devices, the at least one first electronic device and the at least one second electronic device through the power transmission unit.

19. The wireless power transmitter of claim 14, wherein the control module is further configured to:
when a charging mode of a second electronic device of the at least one electronic device among the one or more electronic devices and the at least one first electronic device is switched to a constant voltage (CV) mode, transmit a signal for requesting to switch to a charging standby mode to the second electronic device through the communication unit.

* * * * *